United States Patent
Sakurai et al.

(10) Patent No.: US 9,195,102 B2
(45) Date of Patent: Nov. 24, 2015

(54) LIQUID CRYSTAL PANEL AND ELECTRONIC APPARATUS INCLUDING PIXEL ELECTRODE CONNECTION PORTION

(75) Inventors: Yoshihiro Sakurai, Kanagawa (JP);
Hironao Tanaka, Kanagawa (JP);
Hidemasa Yamaguchi, Kanagawa (JP)

(73) Assignee: Japan Display Inc., Tokyo (JP)

( * ) Notice: Subject to any disclaimer, the term of this patent is extended or adjusted under 35 U.S.C. 154(b) by 621 days.

(21) Appl. No.: 12/642,312

(22) Filed: Dec. 18, 2009

(65) Prior Publication Data

US 2010/0157226 A1    Jun. 24, 2010

(30) Foreign Application Priority Data

Dec. 19, 2008    (JP) .................................. 2008-324779

(51) Int. Cl.
*G02F 1/1343* (2006.01)
*G02F 1/1337* (2006.01)
*G02F 1/1362* (2006.01)

(52) U.S. Cl.
CPC .... *G02F 1/134363* (2013.01); *G02F 1/133707* (2013.01); *G02F 1/136227* (2013.01); *G02F 2001/13373* (2013.01); *G02F 2001/134381* (2013.01); *G02F 2201/122* (2013.01); *G02F 2201/123* (2013.01); *G02F 2201/128* (2013.01)

(58) Field of Classification Search
USPC ......................................................... 349/141
See application file for complete search history.

(56) References Cited

U.S. PATENT DOCUMENTS

| | | | |
|---|---|---|---|
| 6,233,034 B1 | 5/2001 | Lee et al. | |
| 6,522,380 B2 | 2/2003 | Lee et al. | |
| 2006/0103637 A1 | 5/2006 | Yamaguchi et al. | |
| 2009/0128727 A1* | 5/2009 | Yata | 349/46 |
| 2009/0201455 A1* | 8/2009 | Murai | 349/139 |

FOREIGN PATENT DOCUMENTS

| | | |
|---|---|---|
| JP | 10-123482 | 5/1998 |
| JP | 11-202356 | 7/1999 |
| JP | 2000-356786 | 12/2000 |
| JP | 2002-122876 | 4/2002 |
| JP | 2005-196162 | 7/2005 |
| JP | 2008-151817 | 7/2008 |
| JP | 2010-026287 | 2/2010 |
| JP | 2010-101946 | 5/2010 |
| WO | 01/18597 | 3/2001 |
| WO | WO-2008-038432 | * 3/2008 |

OTHER PUBLICATIONS

Japanese Office Action issued Dec. 14, 2010, corresponding to Japanese Appln. No. 2008-324779.

* cited by examiner

*Primary Examiner* — Lauren Nguyen
(74) *Attorney, Agent, or Firm* — K&L Gates LLP

(57) ABSTRACT

A liquid crystal panel includes: first and second substrates arranged to be opposite each other at a predetermined gap; a liquid crystal layer filled between the first and second substrates; alignment films; a counter electrode pattern formed on the first substrate; and a pixel electrode pattern formed on the first substrate so as to have a plurality of electrode branches, the pixel electrode pattern having a partial connection branch formed around a contact so as to transversely connect a plurality of electrode branches extending from the contact from among the plurality of electrode branches.

7 Claims, 25 Drawing Sheets

FIG.24A
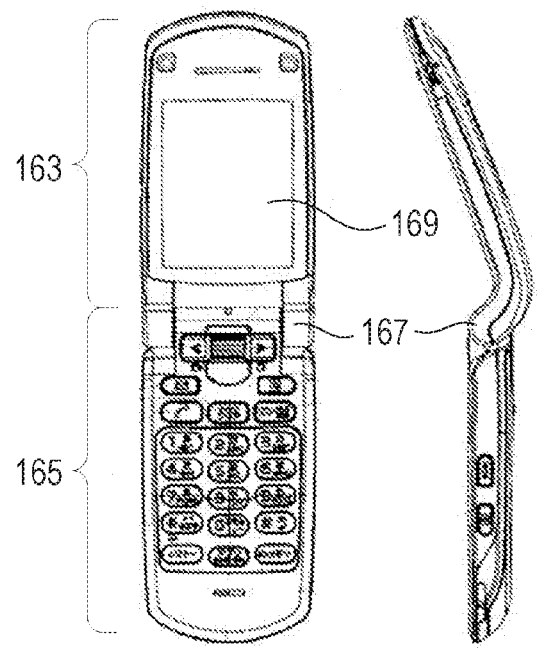
FIG.24B
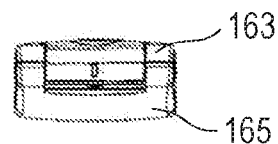
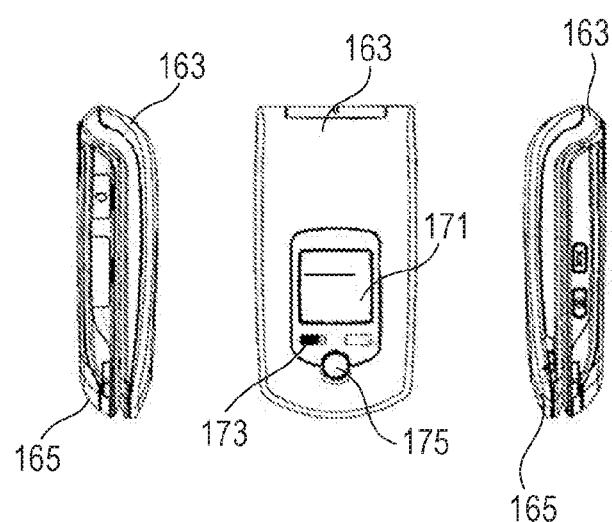
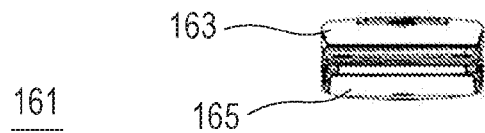

LIQUID CRYSTAL PANEL AND ELECTRONIC APPARATUS INCLUDING PIXEL ELECTRODE CONNECTION PORTION

CROSS REFERENCES TO RELATED APPLICATIONS

The present application claims priority to JP 2008-324779 filed in the Japan Patent Office on Dec. 19, 2008, the entire contents of which is hereby incorporated by reference.

BACKGROUND

The present application relates to a transverse electric field driving liquid crystal panel which performs rotation control of the arrangement of liquid crystal molecules in parallel to a substrate surface by a transverse electric field generated between a pixel electrode and a counter electrode. The present application also relates to an electronic apparatus having the liquid crystal panel mounted therein.

At present, liquid crystal panels have various panel structures corresponding to various driving methods including a vertical electric field display type in which an electric field is generated in the vertical direction with respect to the panel surface. For example, a transverse electric field display type panel structure is suggested in which an electric field is generated in the horizontal direction with respect to the panel surface.

In the transverse electric field display type liquid crystal panel, the rotation direction of liquid crystal molecules is parallel to the substrate surface. That is, in the transverse electric field display type liquid crystal panel, there is little rotation of the liquid crystal molecules in the vertical direction with respect to the substrate surface. For this reason, changes in the optical characteristics (contrast, luminance, and color tone) are comparatively small. That is, the transverse electric field display type liquid crystal panel has a wider viewing angle than the vertical electric field display type liquid crystal panel.

FIG. 1 shows an example of the sectional structure of a pixel region constituting a transverse electric field display type liquid crystal panel. FIG. 2 shows an example of the corresponding planar structure.

A liquid crystal panel 1 has two glass substrates 3 and 5, and a liquid crystal layer 7 filled so as to be sandwiched with the glass substrates 3 and 5. A polarizing plate 9 is disposed on the outer surface of each substrate, and an alignment film 11 is disposed on the inner surface of each substrate. Note that the alignment film 11 is used to arrange a group of liquid crystal molecules of the liquid crystal layer 7 in a predetermined direction. In general, a polyimide film is used.

On the glass substrate 5, a pixel electrode 13 and a counter electrode 15 are formed of a transparent conductive film. Of these, the pixel electrode 13 is structured such that both ends of five comb-shaped electrode branches 13A are respectively connected by connection portions 13B. At the upper end of the pixel electrode 13 in FIG. 2, a rectangular contact portion 13C is formed so as to be connected integrally to part of the electrode branches 13A and the connection portion 13B.

Meanwhile, the counter electrode 15 is formed below the electrode branches 13A (near the glass substrate 5) so as to cover the entire pixel region. This electrode structure causes a parabolic electric field between the electrode branches 13A and the counter electrode 15. In FIG. 1, this electric field is indicated by a dotted-line arrow.

The pixel region corresponds to a region surrounded by signal lines 21 and scanning lines 23 shown in FIG. 2. In each pixel region, a thin film transistor for controlling the application of a signal potential to the pixel electrode 13 is disposed. The gate electrode of the thin film transistor is connected to a scanning line 23, so the thin film transistor is turned on/off by the potential of the scanning line 23.

One main electrode of the thin film transistor is connected to a signal line 21 through an interconnect pattern (not shown), and the other main electrode of the thin film transistor is connected to a contact 25. Thus, when the thin film transistor is turned on, the signal line 21 and the pixel electrode 13 are electrically connected to each other.

As shown in FIG. 2, in this specification, a gap between the electrode branches 13A is called a slit 31. In FIG. 2, the extension direction of the slit 31 is identical to the extension direction of the signal line 21. That is, the slit 31 is formed along the Y-axis direction of FIG. 2.

For reference, FIGS. 3A and 3B show the sectional structure around the contact 25.

JP-A-10-123482 and JP-A-11-202356 are examples of the related art.

SUMMARY

In the transverse electric field display type liquid crystal panel, it is known that, as shown in FIG. 4, the alignment of the liquid crystal molecules is likely to be disturbed at both ends of the slit 31 (around the connection portion of the electrode branches 13A and the connection portion 13B or the contact 13C). This is because the contact portion serves as a rectangular electrode, so no transverse electric field is generated and weak alignment control is performed. Further, the portion around the contact is quite uneven, so this portion causes disturbance of alignment. This phenomenon is called disclination.

In FIG. 4, regions 41 where the above-described disclination is likely to occur are shaded. In FIG. 4, the alignment of the liquid crystal molecules is disturbed at eight regions 41 in total.

If external pressure (finger press or the like) is applied to the disclination, as indicated by an arrow in the drawing, the disturbance of the arrangement of the liquid crystal molecules is expanded along the extension direction of the electrode branches 13A. Note that the disturbance of the arrangement of the liquid crystal molecules is applied such that the arrangement of the liquid crystal molecules is rotated in a direction opposite to the electric field direction. This phenomenon is called a reverse twist phenomenon.

FIG. 5 shows an example of the occurrence of a reverse twist phenomenon. In FIG. 5, regions 43 where the arrangement of the liquid crystal molecules is disturbed are shaded. These regions extend along the extension direction of the electrode branches 13A.

In the case of the liquid crystal panel being used at present, if the reverse twist phenomenon occurs, the original state is not restored after it has been left uncontrolled. This is because the disclination expanded from the upper portion of the pixel is linked with the disclination expanded from the lower portion of the pixel at the central portion of the pixel to form a stabilized state, and the alignment direction of the liquid crystal molecules in the regions 43 is not restored to the original state. As a result, the regions 43 where the reverse twist phenomenon occurs may be continuously viewed as residual images (that is, display irregularity). Hereinafter, the residual image is called a reverse twist line.

Accordingly, a reverse twist line is likely to remain in two electrode branches 13A directly extending from the contact portion 13C. In FIG. 5, two reverse twist lines at the central portion of the pixel region are emphasized over reverse twist lines on both sides.

An embodiment provides a liquid crystal panel. The liquid crystal panel includes first and second substrates arranged to be opposite each other at a predetermined gap, a liquid crystal layer filled between the first and second substrates, alignment films, a counter electrode pattern formed on the first substrate, and a pixel electrode pattern formed on the first substrate so as to have a plurality of electrode branches, the pixel electrode pattern having a partial connection branch formed around a contact so as to transversely connect a plurality of electrode branches extending from the contact from among the plurality of electrode branches.

The pixel electrode pattern and the counter electrode pattern may be formed on the same layer surface, or may be formed on different layer surfaces. That is, if the liquid crystal panel is a transverse electric field display type liquid crystal panel, and the pixel electrode has a slit, the sectional structure of the pixel region is not limited.

The cross angle between the extension direction of each slit formed by the plurality of electrode branches constituting the pixel electrode pattern and the alignment direction of liquid crystal may be equal to or larger than 7°.

As described above, the partial connection branch is formed in the region around the contact with weak alignment stability so as to transversely connect a plurality of electrode branches. Therefore, even though liquid crystal is pressed down by external pressure, disclination which occurs in the region around the contact can be prevented from growing toward the center of the pixel along the electrode branches so as to be confined between the region around the contact and the partial connection branch. As a result, the occurrence of display irregularity (reverse twist line) due to external pressure can be minimized.

Additional features and advantages are described herein, and will be apparent from the following Detailed Description and the figures.

BRIEF DESCRIPTION OF THE FIGURES

FIGS. 24A and 24B are diagrams showing an appearance example of an electronic apparatus.

DETAILED DESCRIPTION

The present application will be described as follows with reference to the drawings according to an embodiment.

(A) Appearance Example of Liquid Crystal Panel Module and Panel Structure (B) Pixel Structure Example 1: Single Domain Structure (C) Pixel Structure Example 2: Pseudo Dual Domain Structure (D) Pixel Structure Example 3: Dual Domain Structure (E) Pixel Structure Example 4: Dual Domain Structure (F) Pixel Structure Example 5: Different Sectional Structure (G) Pixel Structure Example 6: Different Sectional Structure (H) Pixel Structure Example 7: Different Pixel Structure Example (I) Other Examples Elements which are not provided with particular drawings or descriptions herein are realized by existing techniques in the relevant technical field. Embodiments described below are only exemplary, and the application is not limited thereto.

(A) Appearance Example of Liquid Crystal Panel Module and Panel Structure

Figure 6:
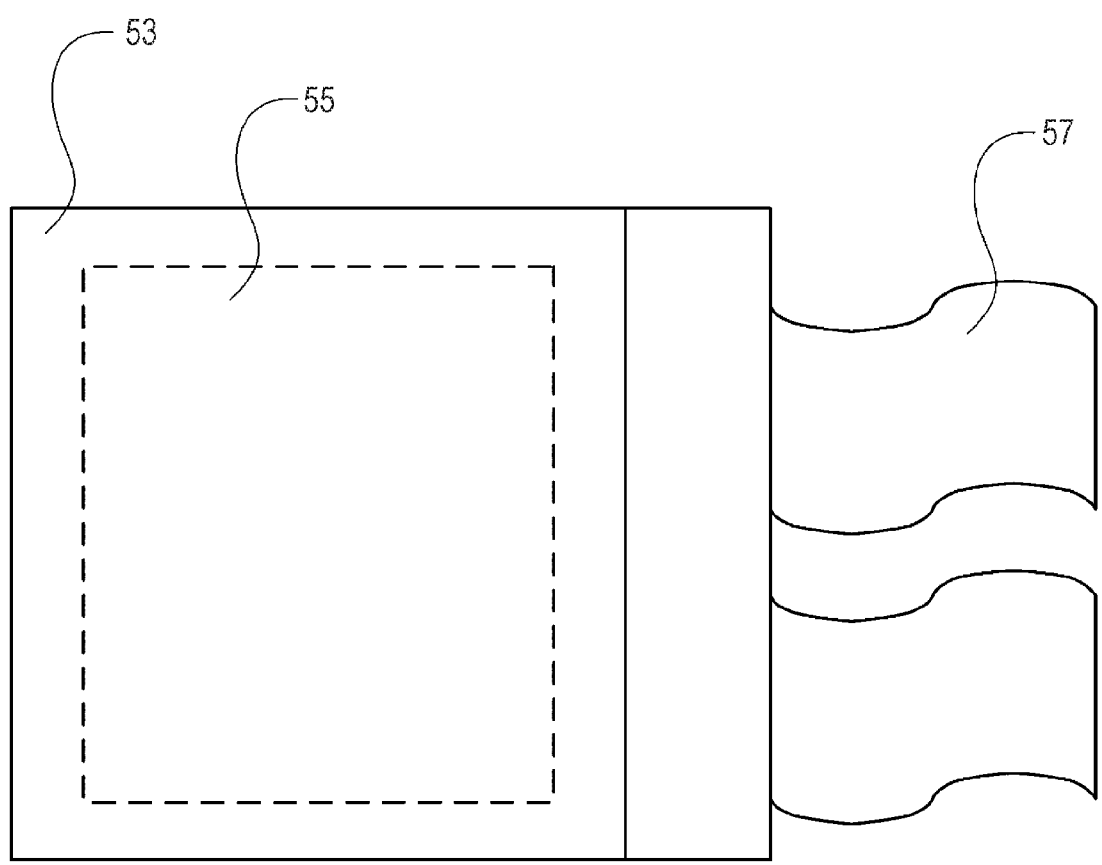
FIG. 6 is a diagram showing an appearance example of a liquid crystal panel module.

FIG. 6 shows an appearance example of a liquid crystal panel module 51. The liquid crystal panel module 51 is structured such that a counter substrate 55 is bonded to a support substrate 53. The support substrate 53 is made of glass, plastic, or other substrates. The counter substrate 55 is also made of glass, plastic, or other transparent substrates. The counter substrate 55 is a member which seals the surface of the support substrate 53 with a sealant interposed therebetween.

Note that only one substrate on the light emission side may be a transparent substrate, and the other substrate may be a nontransparent substrate.

Further, the liquid crystal panel 51 is provided with an FPC (Flexible Printed Circuit) 57 for inputting an external signal or driving power, if necessary.

Figure 7:
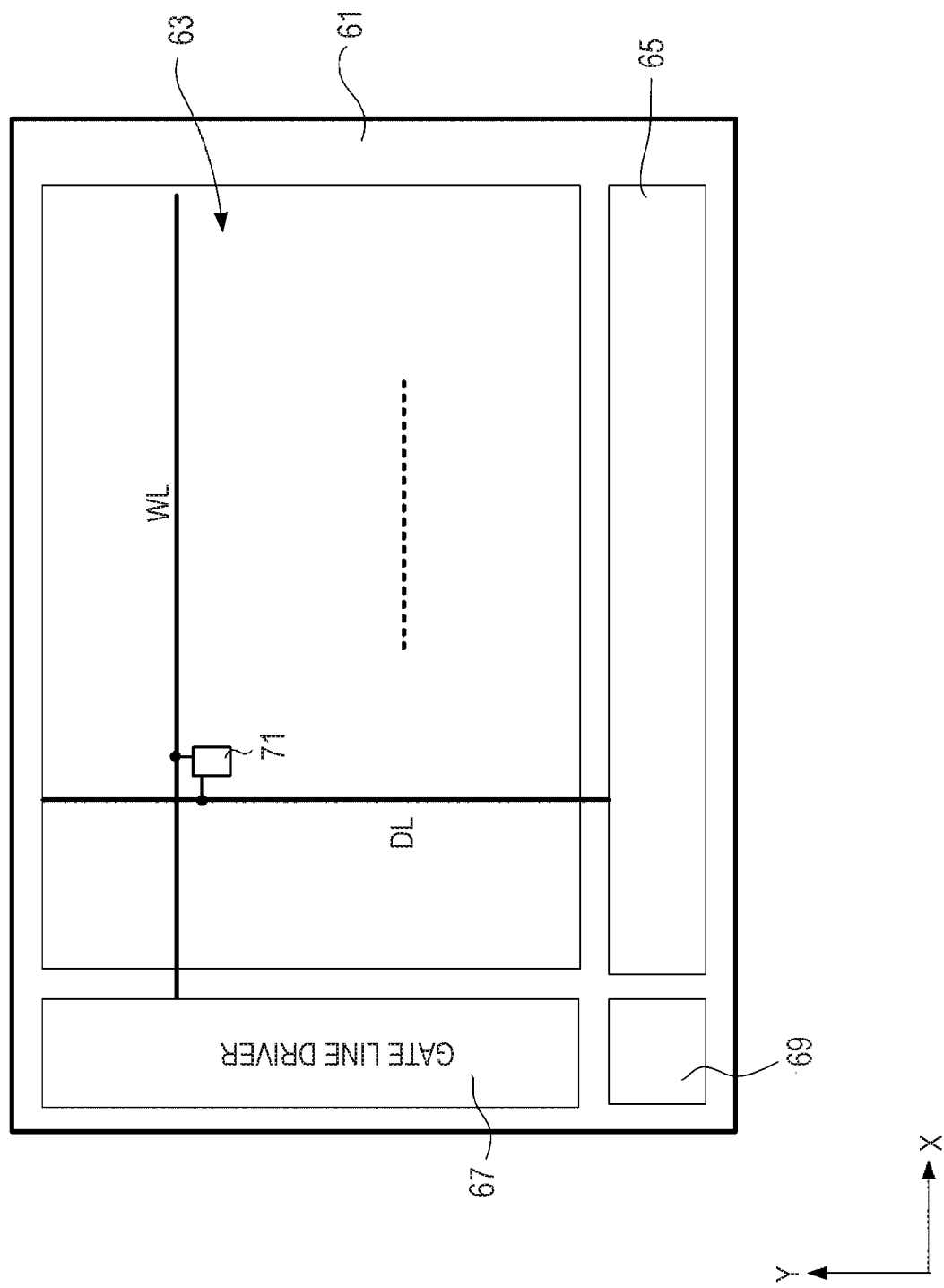
FIG. 7 is a diagram showing an example of the system configuration of a liquid crystal panel module.

FIG. 7 shows an example of the system configuration of the liquid crystal panel module 51. The liquid crystal panel module 51 is configured such that a pixel array section 63, a signal line driver 65, a gate line driver 67, and a timing controller 69 are disposed on a lower glass substrate 61 (corresponding to the glass substrate 5 of FIG. 1). In this embodiment, the driving circuit of the pixel array section 63 is formed as a single or a plurality of semiconductor integrated circuits, and is mounted on the glass substrate.

The pixel array section 63 has a matrix structure in which white units each constituting one pixel for display are arranged in M rows×N columns. In this specification, the row refers to a pixel row of 3×N subpixels 71 arranged in the X direction of the drawing. The column refers to a pixel column of M subpixels 71 arranged in the Y direction of the drawing. Of course, the values M and N are determined depending on the display resolution in the vertical direction and the display resolution in the horizontal direction.

The signal line driver 65 is used to apply a signal potential Vsig corresponding to a pixel gradation value to signal lines DL. In this embodiment, the signal lines DL are arranged so as to extend in the Y direction of the drawing.

The gate line driver 67 is used to apply control pulses for providing the write timing of the signal potential Vsig to scanning lines WL. In this embodiment, the scanning lines WL are arranged so as to extend in the X direction of the drawing.

A thin film transistor (not shown) is formed in each subpixel 71. The thin film transistor has a gate electrode connected to a corresponding one of the scanning lines WL, one main electrode connected to a corresponding one of the signal lines DL, and the other main electrode connected to the pixel electrode 13.

The timing controller 69 is a circuit device which supplies driving pulses to the signal line driver 65 and the gate line driver 67.

(B) Pixel Structure Example 1

Figure 8:
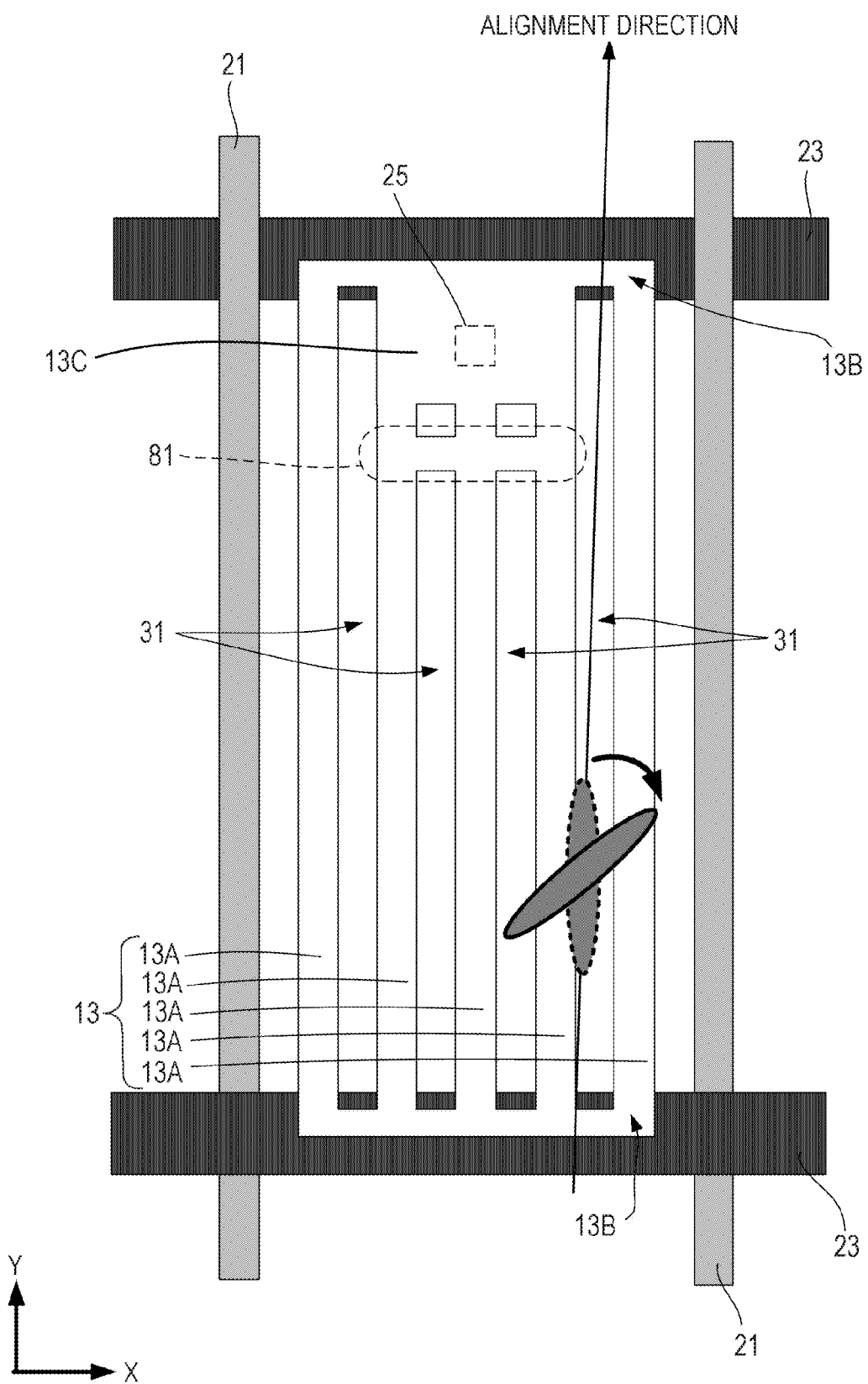
FIG. 8 is a diagram showing a first pixel structure example (planar structure).

FIG. 8 shows a pixel structure example. This pixel structure is used in an FFS (Fringe Field Switching) type liquid crystal panel.

Figure 1:
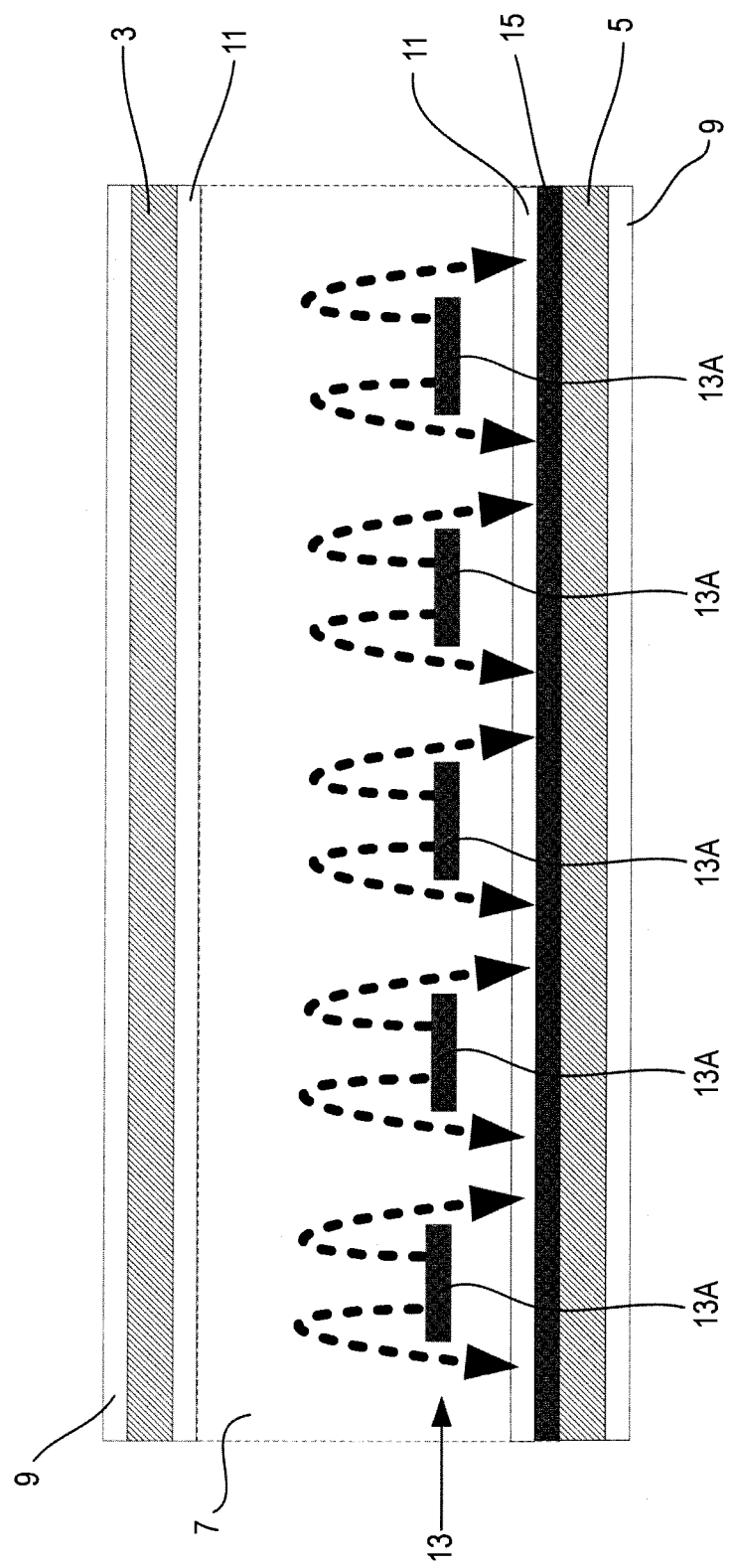
FIG. 1 is a diagram illustrating an example of the sectional structure of a transverse electric field display type liquid crystal panel.

Thus, the sectional structure of the pixel region is the same as shown in FIG. 1. That is, the counter electrode 15 is disposed below the pixel electrode 13 so as to cover the entire pixel region.

Figure 2:
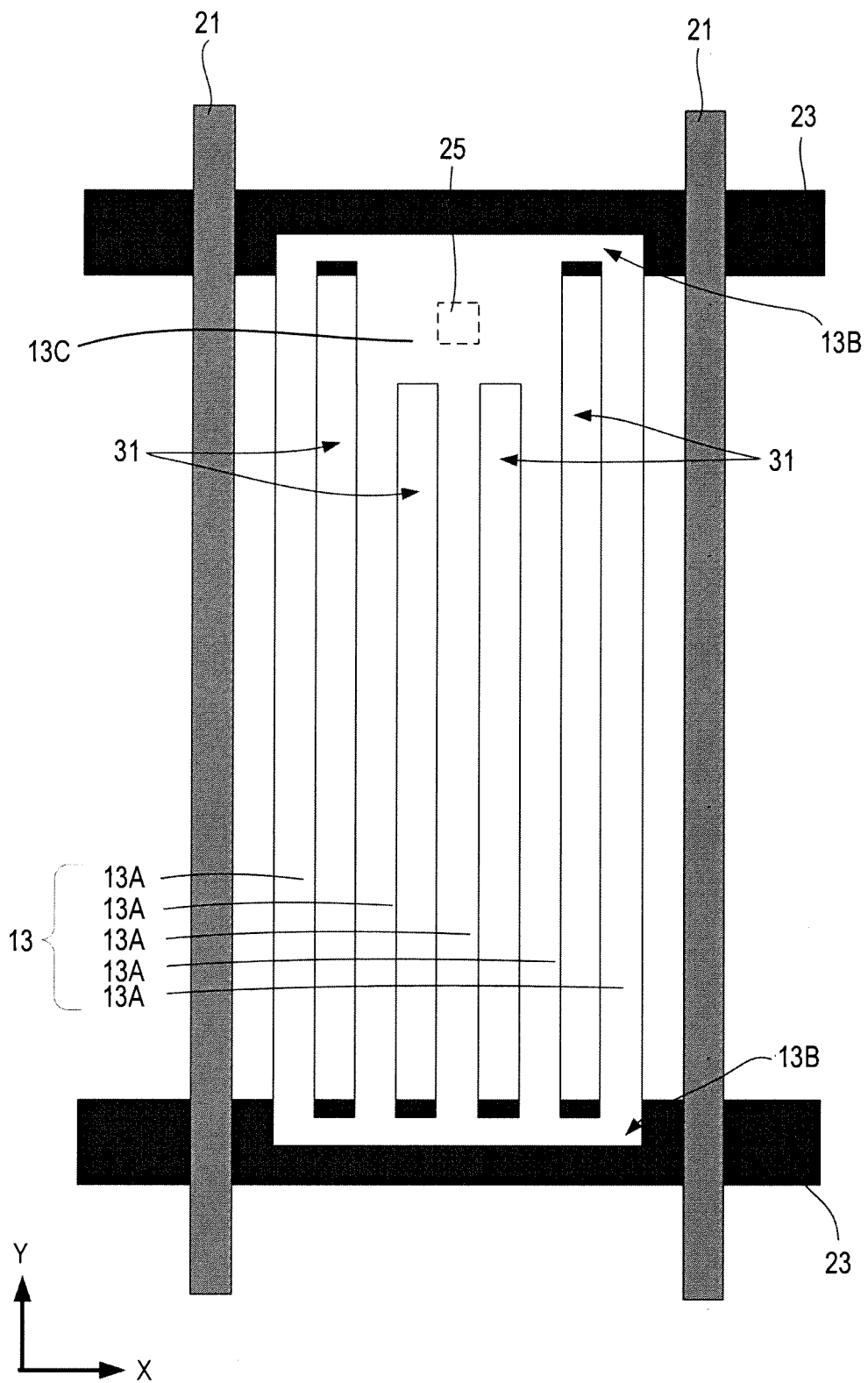
FIG. 2 is a diagram illustrating an example of the planar structure of a transverse electric field display type liquid crystal panel.
Figure 3A:
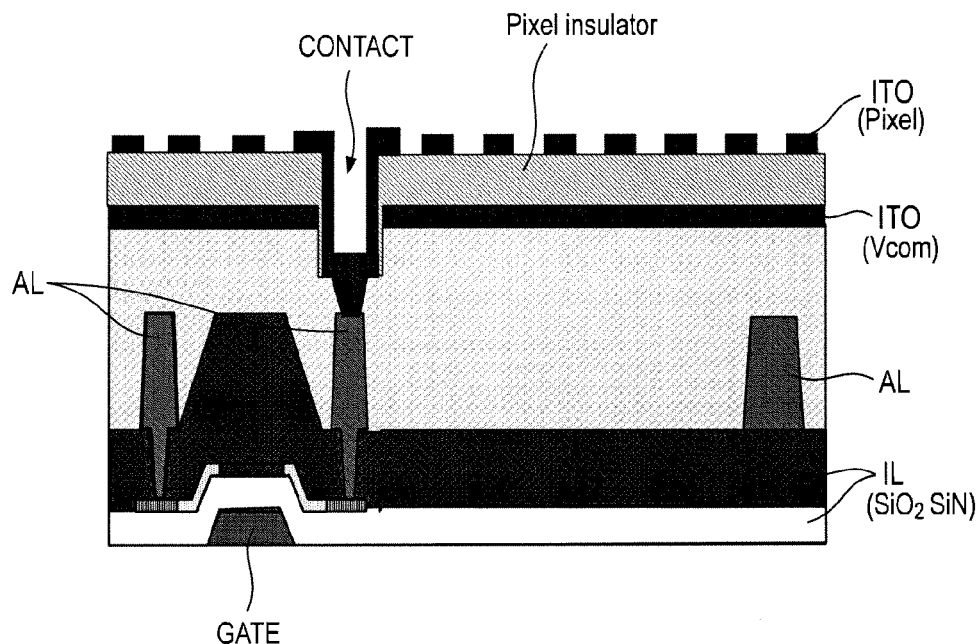
FIGS. 3A and 3B are diagrams showing an example of the sectional structure around a contact.
Figure 3B:
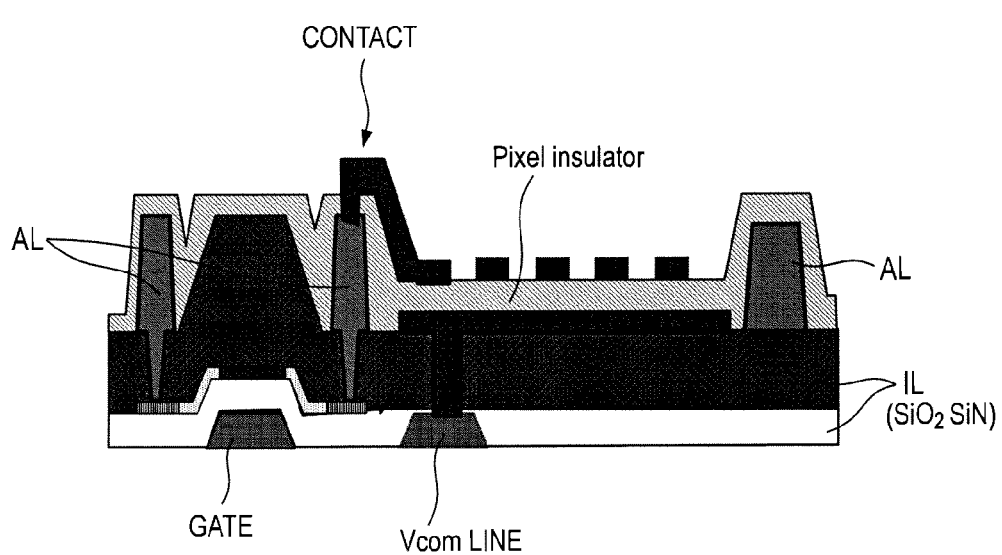
Figure 4:
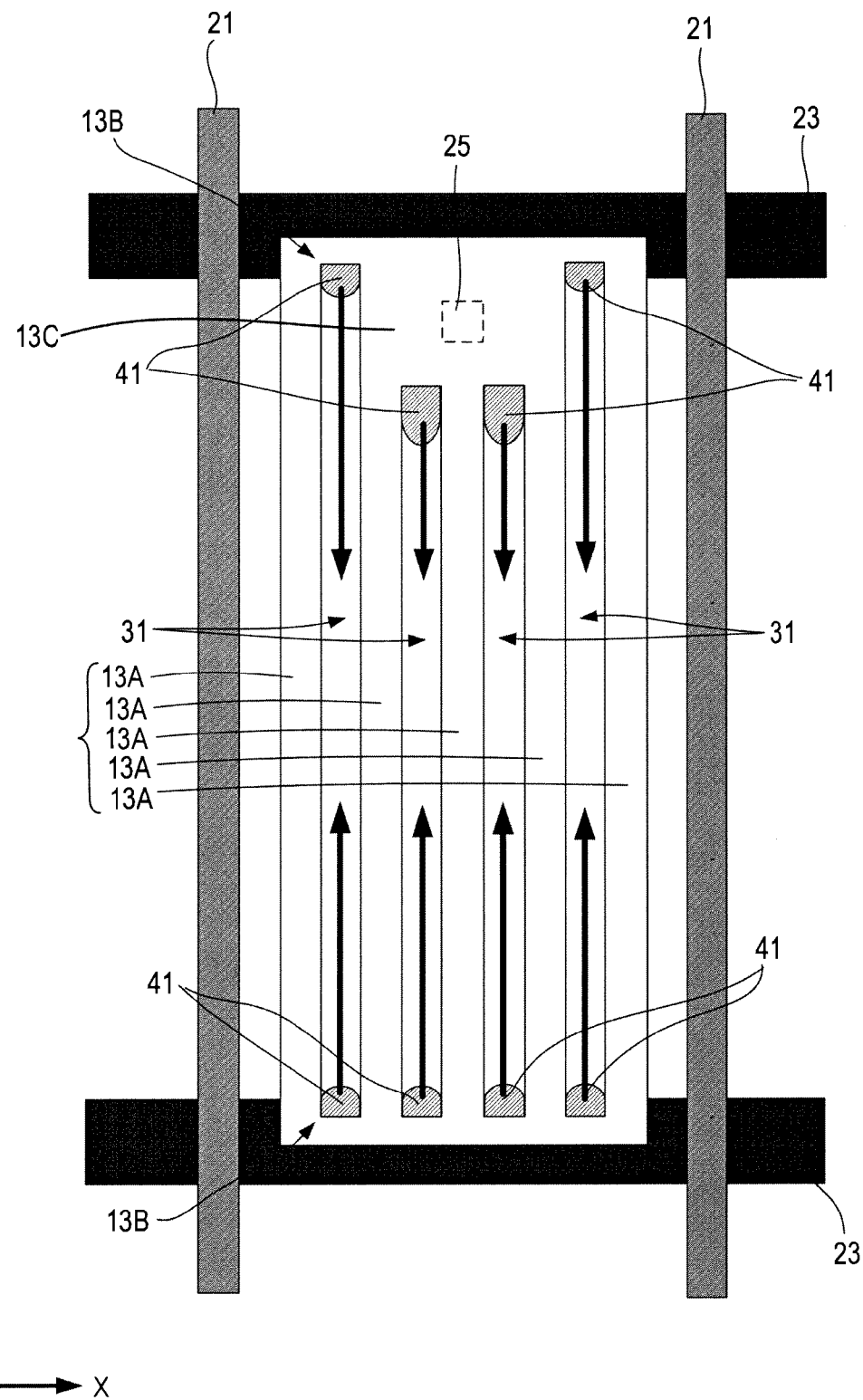
FIG. 4 is a diagram illustrating disclination.

The pixel structure shown in FIG. 8 has the same basic structure as the pixel structure shown in FIG. 2. That is, the pixel electrode 13 is structured such that both ends of comb-shaped five electrode branches 13A are respectively connected to each other by connection portions 13B.

The pixel electrode 13 has a contact portion 13C at the upper end of the pixel region in the drawing. The contact portion 13C is connected to the thin film transistor (not shown) through a contact 25 formed at the central portion thereof.

One end of the contact portion 13C is connected to the connection portion 13B, and the other end of the contact portion 13C is connected to three electrode branches 13A.

The three electrode branches 13A are electrode branches 13A other than two electrode branches 13A at both ends from among the five electrode branches 13A.

The contact portion 13C has a large pattern area. For this reason, at the boundary between the contact portion 13C and two slits 31 which are formed by the three electrode branches 13A directly connected to the contact portion 13C, alignment stability is likely to be weakened. The weak alignment stability means that reverse twist which occurs when liquid crystal is pressed down is likely to grow.

Accordingly, in the pixel structure example of FIG. 8, a partial connection branch 81 is formed around the contact portion 13C so as to transversely connect the three electrode branches 13A directly extending from the contact portion 13C. With this partial connection portion 81, the two slits 31 formed by the three electrode branches 13A at the central portion of the pixel region can be physically divided into two regions.

The two slits 31 are slits where the growth of reverse twist is likely to dominantly appear when liquid crystal is pressed down.

Figure 9:
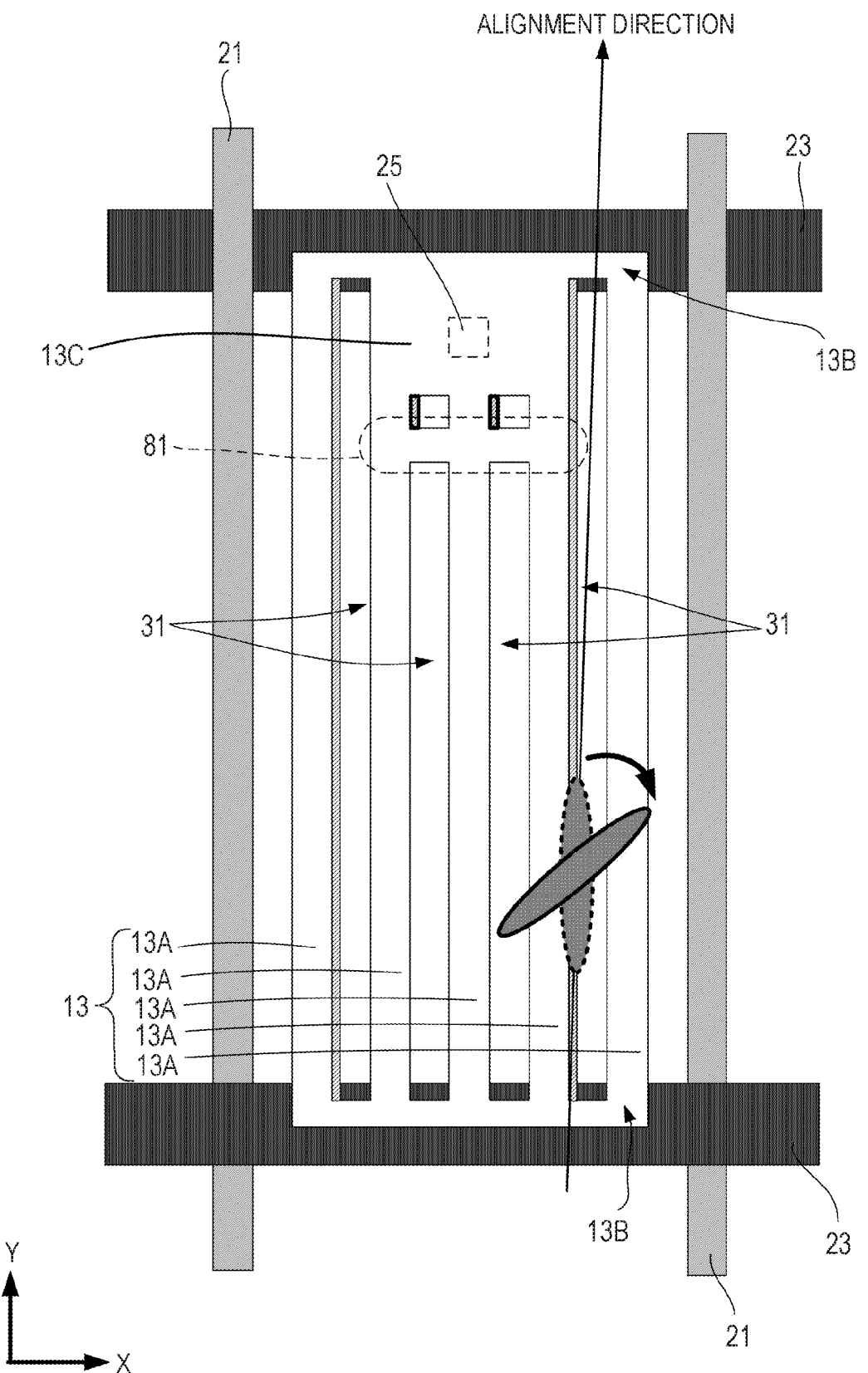
FIG. 9 is a diagram illustrating an occurrence example of a reverse twist line.

However, with the partial connection branch 81, even though liquid crystal is pressed down, the growth of the reverse twist can be confined within the slit 31 on the contact portion 13C side and can be prevented from reaching around the center of the pixel region. FIG. 9 shows a state where liquid crystal is pressed down due to external pressure.

Figure 5:
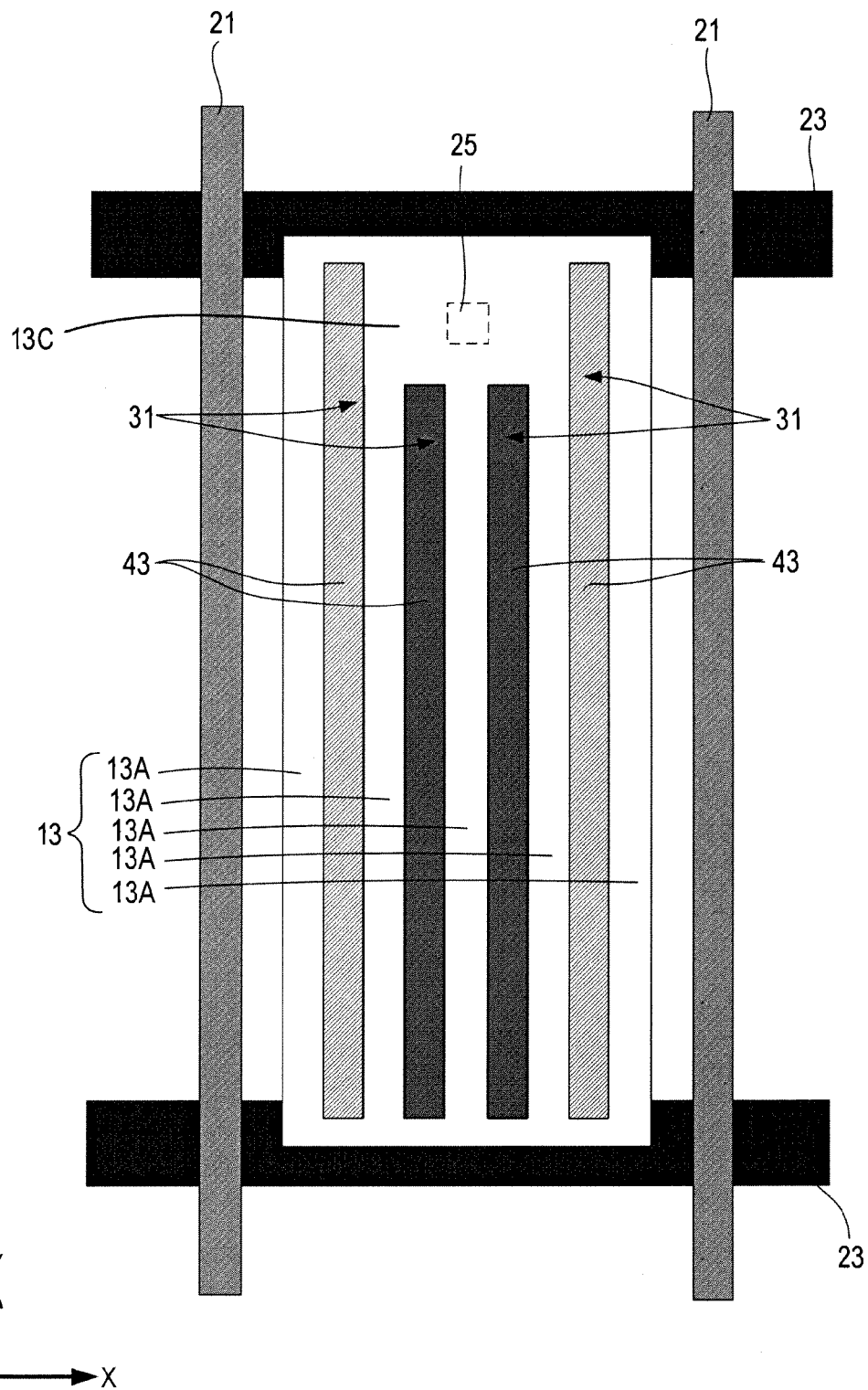
FIG. 5 is a diagram illustrating a reverse twist phenomenon.

As will be understood from the comparison of FIGS. 9 and 5, in the pixel region where the partial connection branch 81 is formed, a reverse twist line which remains in the pixel region is significantly reduced. In particular, a reverse twist line which occurs around the center of the pixel region can be eliminated or significantly reduced.

As a result, with this pixel structure, the display quality can be significantly improved over the liquid crystal panel.

It is preferable that the space formed between the contact portion 13C and the partial connection branch 81 is as small as possible. For example, the space is preferably small to be close to the manufacturing limit. This is because, the narrower the space, the more the area of the pixel region to which the alignment regulation force is applied can be increased.

Similarly, it should suffice that the partial connection branch 81 can divide the region into two parts, so the pattern width of the partial connection branch 81 is preferably thin to be close to the manufacturing limit.

(C) Pixel Structure Example 2

Figure 10:
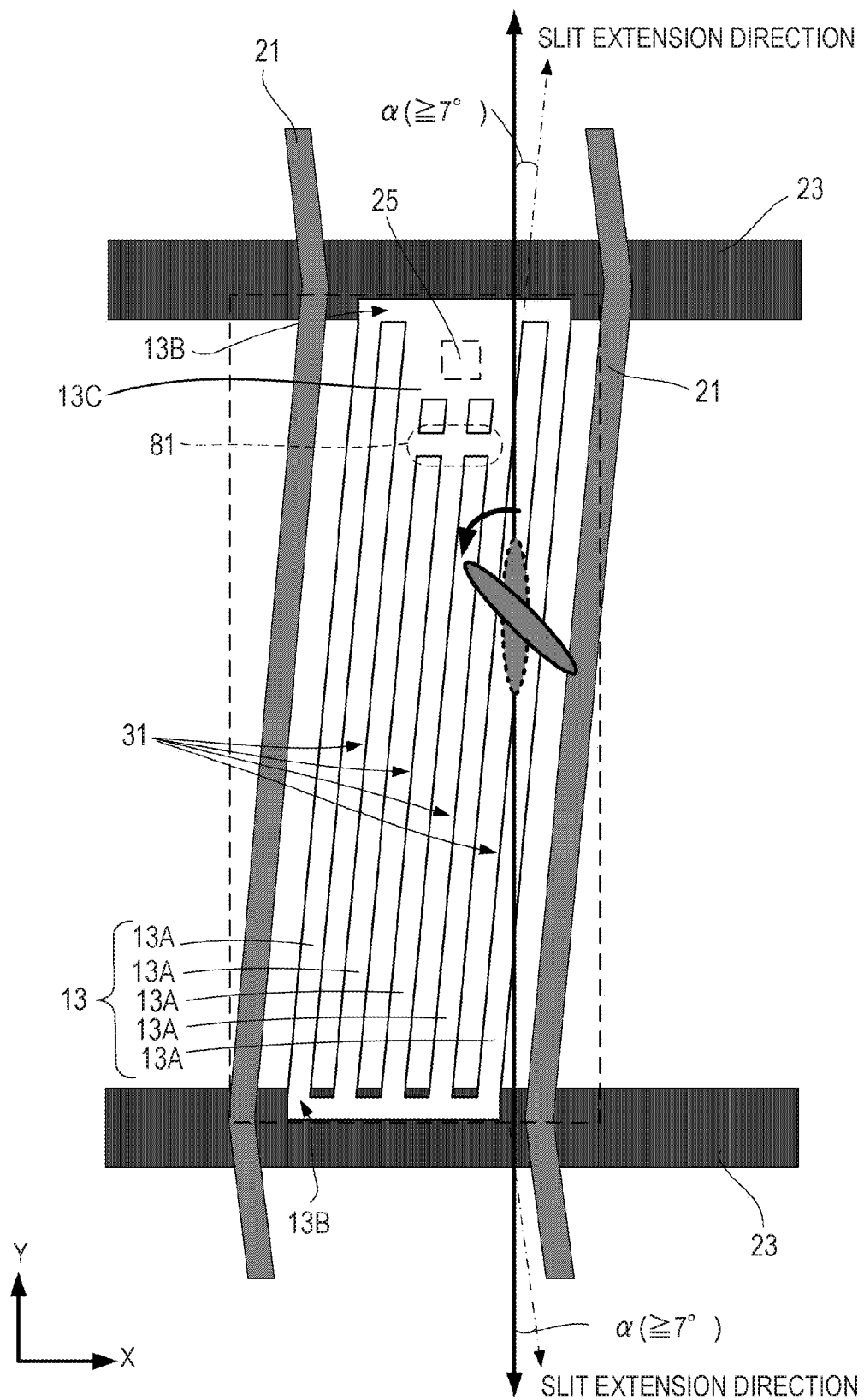
FIG. 10 is a diagram showing a second pixel structure example (planar structure).

FIG. 10 shows a second pixel structure example. It is assumed that this pixel structure example is also used in an FFS (Fringe Field Switching) type liquid crystal panel.

The pixel electrode 13 has the same basic pattern structure as the above-described pixel structure example (FIG. 8). That is, the pixel electrode 13 has five electrode branches 13A, a connection portion 13B, a contact portion 13C, and a partial connection branch 81.

Meanwhile, in the above-described pixel structure example (FIG. 8), the case where the signal lines 21 and the electrode branches 13A are formed in parallel to the Y-axis direction has been described.

The pixel structure example of FIG. 10 is different from the above-described pixel structure example in that the wirings in the pixel region are formed so as to be inclined with respect to the Y-axis direction.

The inclination direction is inverted between two upper and lower pixel regions arranged in the Y-axis direction. That is, a pattern which is inclined in the clockwise direction with respect to the Y-axis direction and a pattern which is inclined in the counterclockwise direction with respect to the Y-axis direction are alternately disposed along the Y-axis direction. In other words, the pixel regions in this embodiment have a vertical mirror structure with respect to the scanning line 23 extending in the X-axis direction.

FIG. 10 mainly shows a case where the pattern of the pixel region is inclined in the clockwise direction with respect to the Y-axis direction. The alignment direction of the alignment film 11 is parallel to the Y-axis direction. Therefore, in this pixel region, the liquid crystal molecules rotate in the counterclockwise direction by the application of an electric field.

Of course, a pixel region where the pattern in the pixel region is inclined in the counterclockwise direction with respect to the Y-axis direction is formed above and below the pixel region shown in FIG. 10. In this region, the liquid crystal molecules rotate in the clockwise direction by the application of an electric field.

As described above, the rotation direction of the liquid crystal molecules is inverted between the two upper and lower pixel regions, so a liquid crystal panel with a wide viewing angle can be realized.

The above-described pixel structure constitutes a pseudo dual domain structure.

Hereinafter, the preferable relationship between the alignment direction of the liquid crystal layer 7 and the extension direction of each slit 31 formed by the electrode branches 13A will be described. Note that the alignment direction of the liquid crystal layer 7 (also referred to as "alignment direction of liquid crystal") is defined by the orientation of dielectric anisotropy of liquid crystal, and refers to a direction with a large dielectric constant.

In the pixel structure of FIG. 10, a case where the cross angle α between the alignment direction of the liquid crystal layer 7 and the extension direction of each slit 31 formed by the electrode branches 13A is equal to or larger than 7° is shown as a preferred structure.

This value is determined by the following experiment. Hereinafter, the characteristics confirmed by the inventors will be described.

Figure 11:
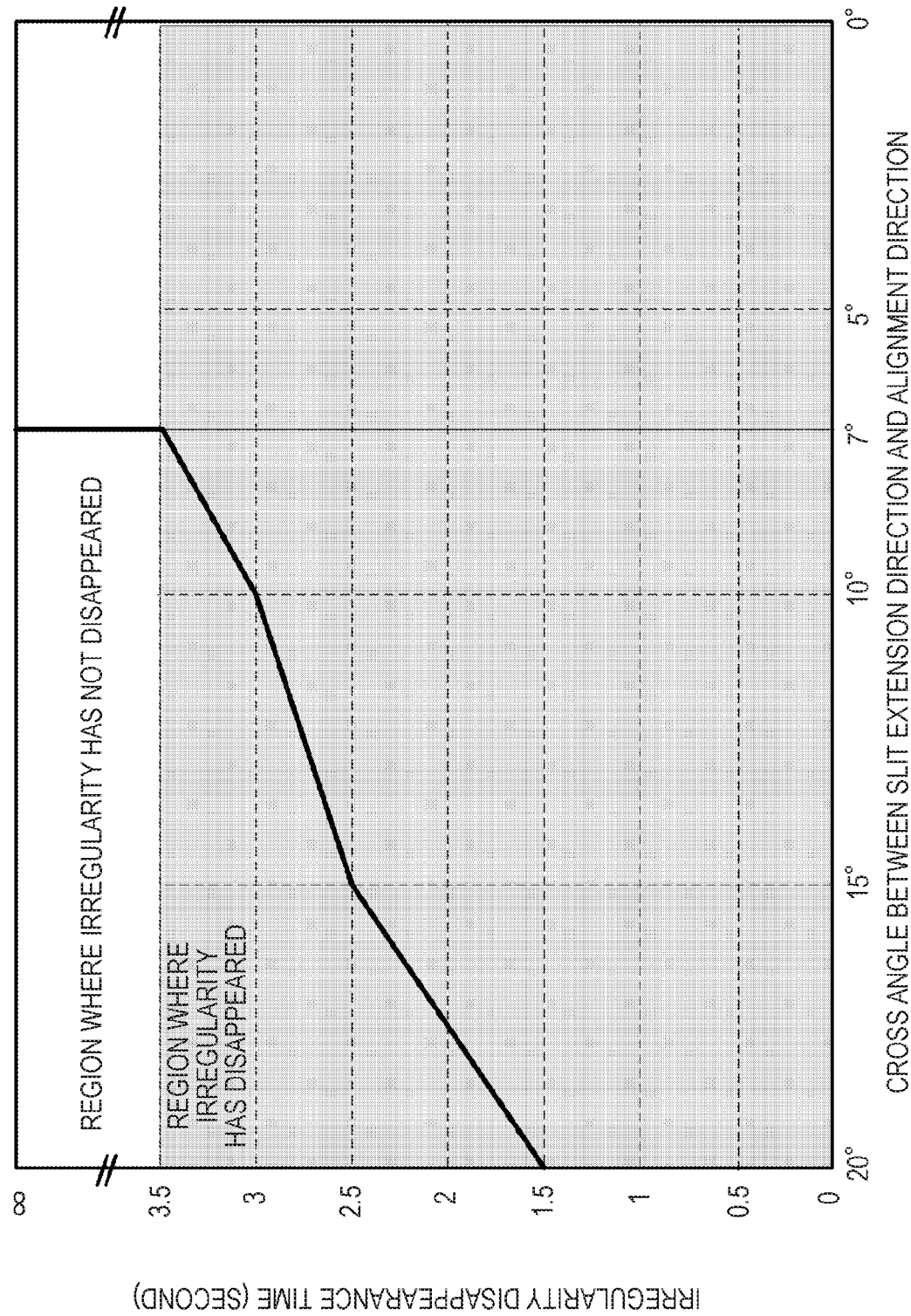
FIG. 11 is a diagram illustrating the relationship between the magnitude of a cross angle and display irregularity disappearance time.

FIG. 11 shows the characteristics which are recognized between the extension direction of the slit 31 and the alignment direction of the liquid crystal layer 7. FIG. 11 shows the relationship between the cross angle α and the time until display irregularity disappears. In FIG. 11, the horizontal axis denotes the cross angle α between the extension direction of the slit 31 and the alignment direction of the liquid crystal layer 7, and the vertical axis denotes the time until display irregularity disappears.

From the experiment result shown in FIG. 11, when the cross angle α is smaller than 7°, it has been confirmed that display irregularity due to the reverse twist phenomenon does not disappear by itself.

Meanwhile, when the cross angle α is equal to or larger than 7°, it has been confirmed that display irregularity due to the reverse twist phenomenon can disappear by itself. For this reason, in FIG. 10, the cross angle α is shown to be equal to or larger than 7°.

When the cross angle α is 7°, the time until display irregularity disappears is 3.5 [seconds]. The experiment shows that, as the cross angle α becomes larger, the time until display irregularity disappears is shortened.

For example, when the cross angle α is 10°, it has been confirmed that display irregularity disappears in 3 [seconds]. When the cross angle α is 15°, it has been confirmed that display irregularity disappears in 2.5 [seconds]. When the cross angle α is 20°, it has been confirmed that display irregularity disappears in 1.5 [seconds].

From this, it can be seen that, as the cross angle α becomes larger, the alignment regulation force of the liquid crystal molecules in the transverse electric field display type liquid crystal panel can be increased.

Figure 12:
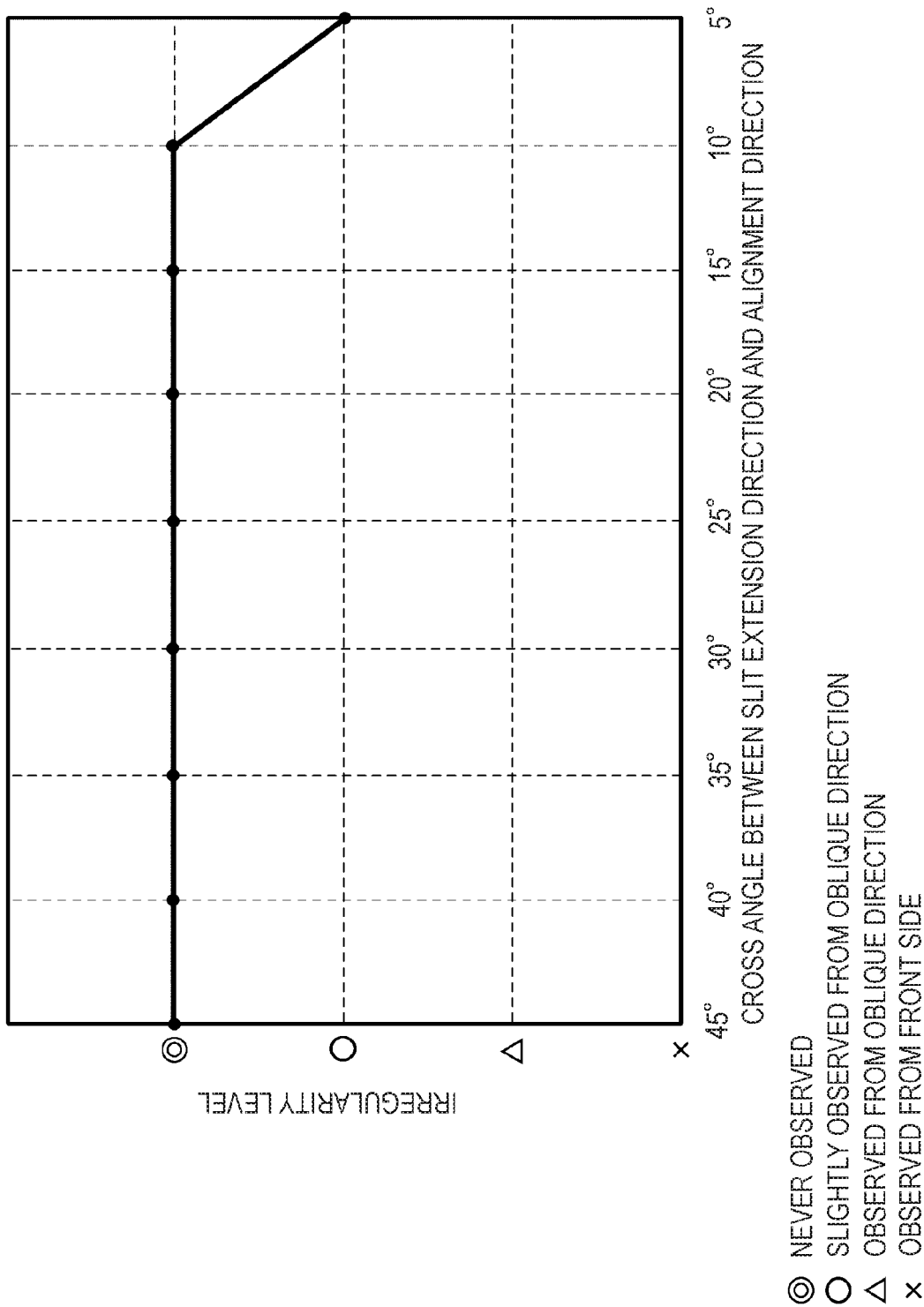
FIG. 12 is a diagram illustrating the relationship between the magnitude of a cross angle and the level of display irregularity.

FIG. 12 shows the observation result regarding the relationship between the cross angle α and the level of display irregularity. In FIG. 12, the horizontal axis denotes the cross angle α between the extension direction of the slit 31 and the alignment direction of the liquid crystal layer 7, and the vertical axis denotes the visible level of display irregularity.

As shown in FIG. 12, if the cross angle α is equal to or larger than 10°, it has been confirmed that no display irregularity is observed even when the display screen is viewed at any angle. When the cross angle α is 5°, it has been confirmed that, when the display screen is viewed from an oblique direction, slight display irregularity is observed. When the cross angle α is equal to or larger than 5° and smaller than 10°, as shown in FIG. 12, it has been confirmed that visibility is gradually changed.

However, the larger cross angle α is not necessarily the better.

Figure 13:
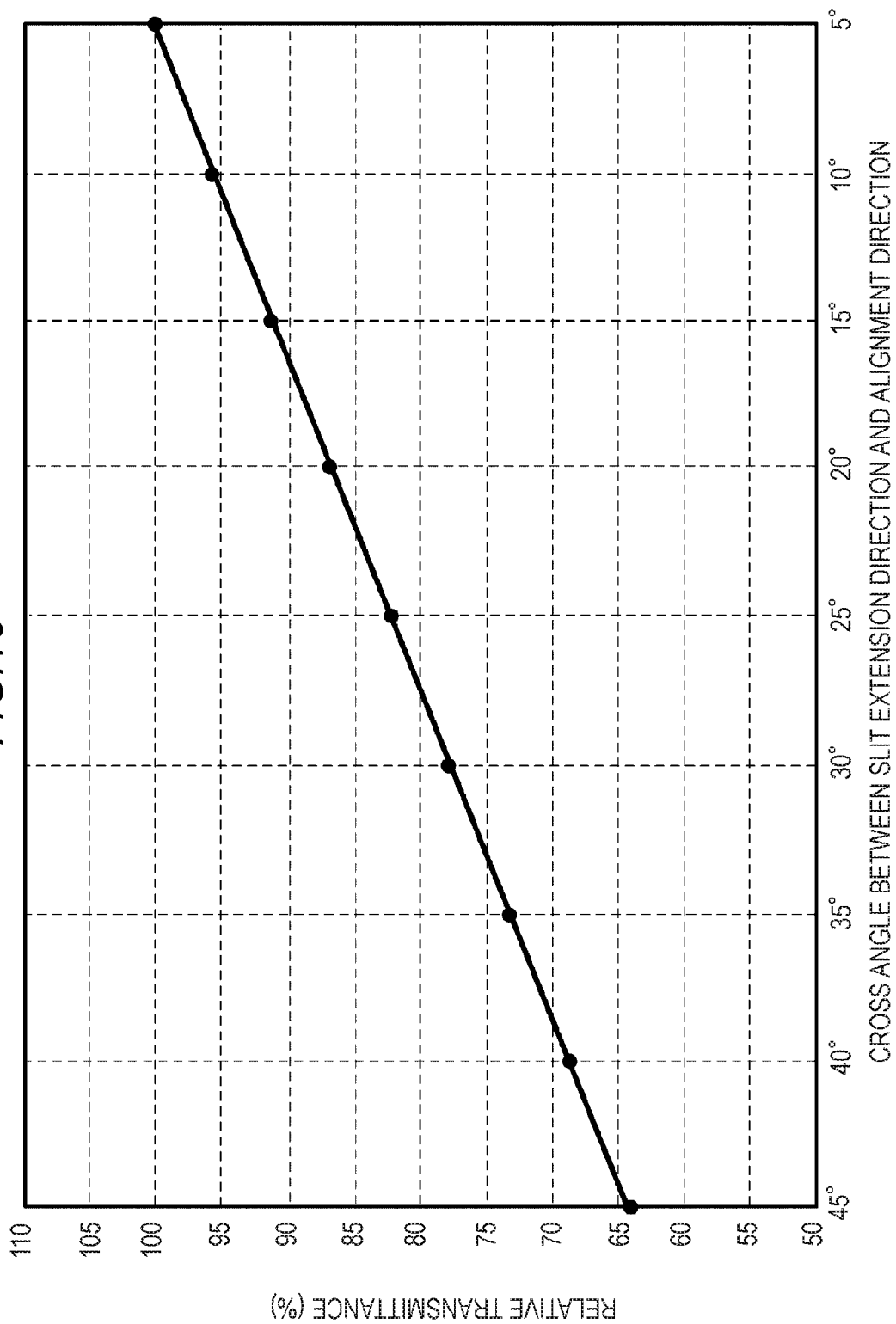
FIG. 13 is a diagram illustrating the relationship between the magnitude of a cross angle and relative transmittance.

FIG. 13 shows the confirmed transmission characteristics. In FIG. 13, the horizontal axis denotes the cross angle α between the extension direction of the slit 31 and the alignment direction of the liquid crystal layer 7, and the vertical axis denotes relative transmittance. In FIG. 13, it is assumed that, when the cross angle α is 5°, the relative transmittance is 100%.

In FIG. 13, when the cross angle α is 5°, the maximum transmittance is obtained, and when the cross angle α is 45°, the minimum transmittance is obtained. Note that, when the cross α is 45°, the relative transmittance is about 64%.

As shown in FIG. 13, it has been seen that the cross angle α and the relative transmittance have a roughly linear relationship. From the viewpoint of transmittance, it can be seen that, as the cross angle α is smaller, better display luminance is obtained.

From the above-described characteristics, the inventors have considered it preferable that the cross angle α between the extension direction of the slit 31 and the alignment direction of the liquid crystal layer 7 be equal to or larger than 7° and equal to or smaller than 15°. If this condition is satisfied, the relative transmittance and the time until display irregularity disappears can be maintained appropriately.

Therefore, a liquid crystal panel can be realized in which, even though the reverse twist phenomenon due to finger press or the like disturbs the arrangement of the liquid crystal molecules, the disturbance can be eliminated by itself in several seconds.

(D) Pixel Structure Example 3

Figure 14:
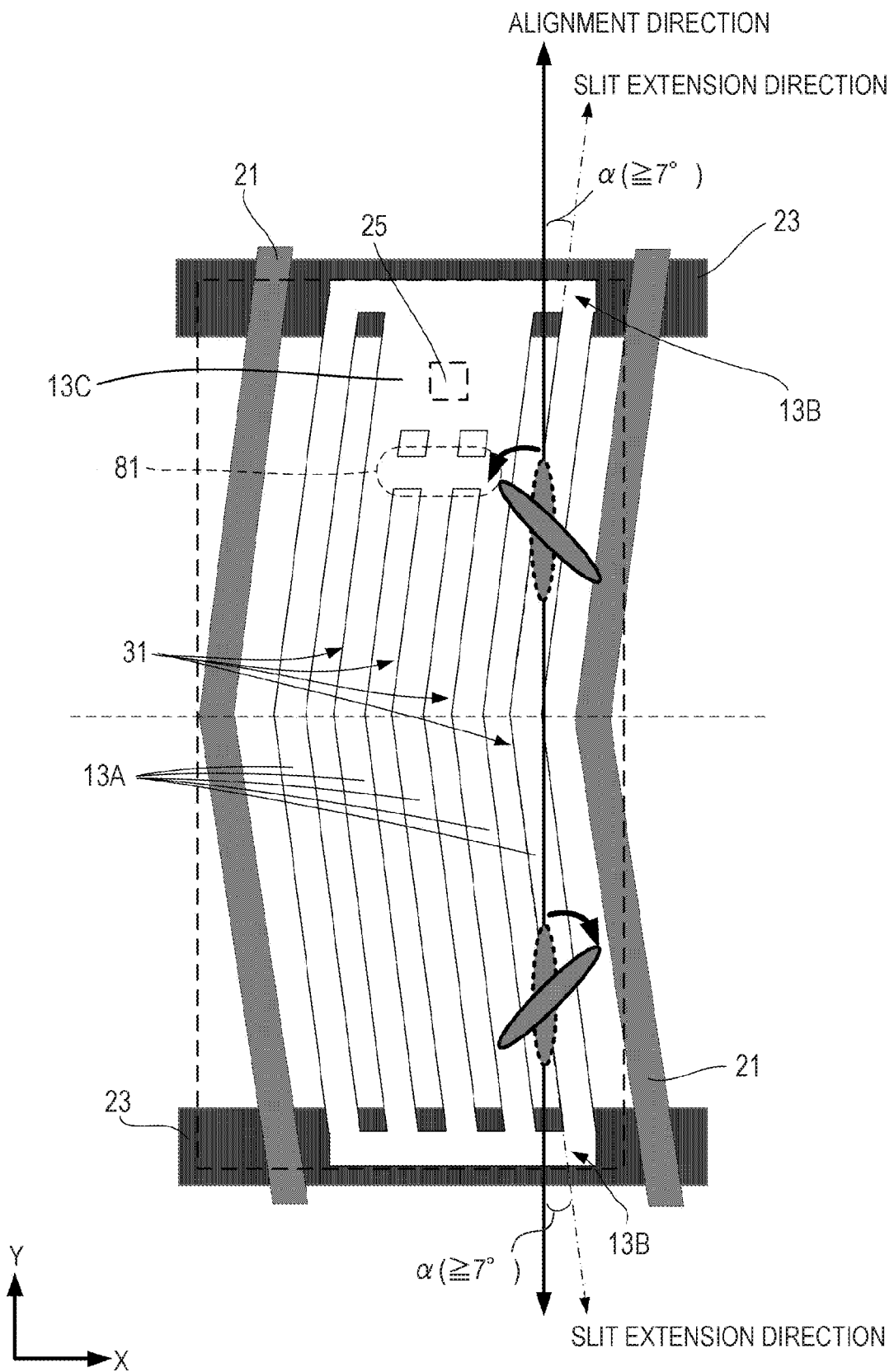
FIG. 14 is a diagram showing a third pixel structure example (planar structure).

FIG. 14 shows a third pixel structure example. This pixel structure is also used in an FFS (Fringe Field Switching) type liquid crystal panel.

However, in the third pixel structure, each pixel region has a dual domain structure. That is, the pixel electrode 13 is bent around the center of the pixel region (in the drawing, a rectangular region indicated by a broken line) in the Y-axis direction.

In FIG. 14, one bend point is provided, but two or more bend points may be provided to form a multi-domain structure.

The pixel structure shown in FIG. 14 has a vertical mirror structure along a virtual line extending along the X-axis direction from the bend point. One contact portion 13C and one partial connection branch 81 are provided in the pixel region. Therefore, the contact portion 13C and partial connection branch 81 are not included in the vertical mirror structure. The vertical mirror structure includes the signal line 21 as well as the pixel electrode 13.

Under this condition, the cross angle α between the alignment direction of the liquid crystal layer 7 and the extension direction of the slit 31 is set to be equal to or larger than 7°. Of course, from the viewpoint of display performance, it is preferable that the cross angle α is equal to or larger than 7° and smaller than 15°. Further, it is assumed that the alignment direction of the liquid crystal layer 7 is parallel to the Y-axis direction.

In the case of the pixel structure with a dual domain structure, the rotation direction of the liquid crystal molecules is inverted between the upper half portion and the lower half portion of the pixel region. That is, while the liquid crystal molecules in the upper half portion of the pixel region of the drawing rotate in the counterclockwise direction by the application of an electric field, and the liquid crystal molecules in the lower half portion of the pixel region of the drawing rotate in the clockwise direction by the application of an electric field.

As described above, the rotation direction of the liquid crystal molecules is inverted, so the amount of light per pixel can be made uniform even when the display screen is viewed at any angle. Therefore, a liquid crystal panel with a wider viewing angle than the first pixel structure can be realized.

Of course, as described above, the relationship between the alignment direction of the liquid crystal layer 7 and the extension direction of the slit 31 is optimized. Therefore, even though the reverse twist due to finger press or the like disturbs the arrangement of the liquid crystal molecules, the disturbance can be eliminated by itself in several seconds.

(E) Pixel Structure Example 4

Figure 15:
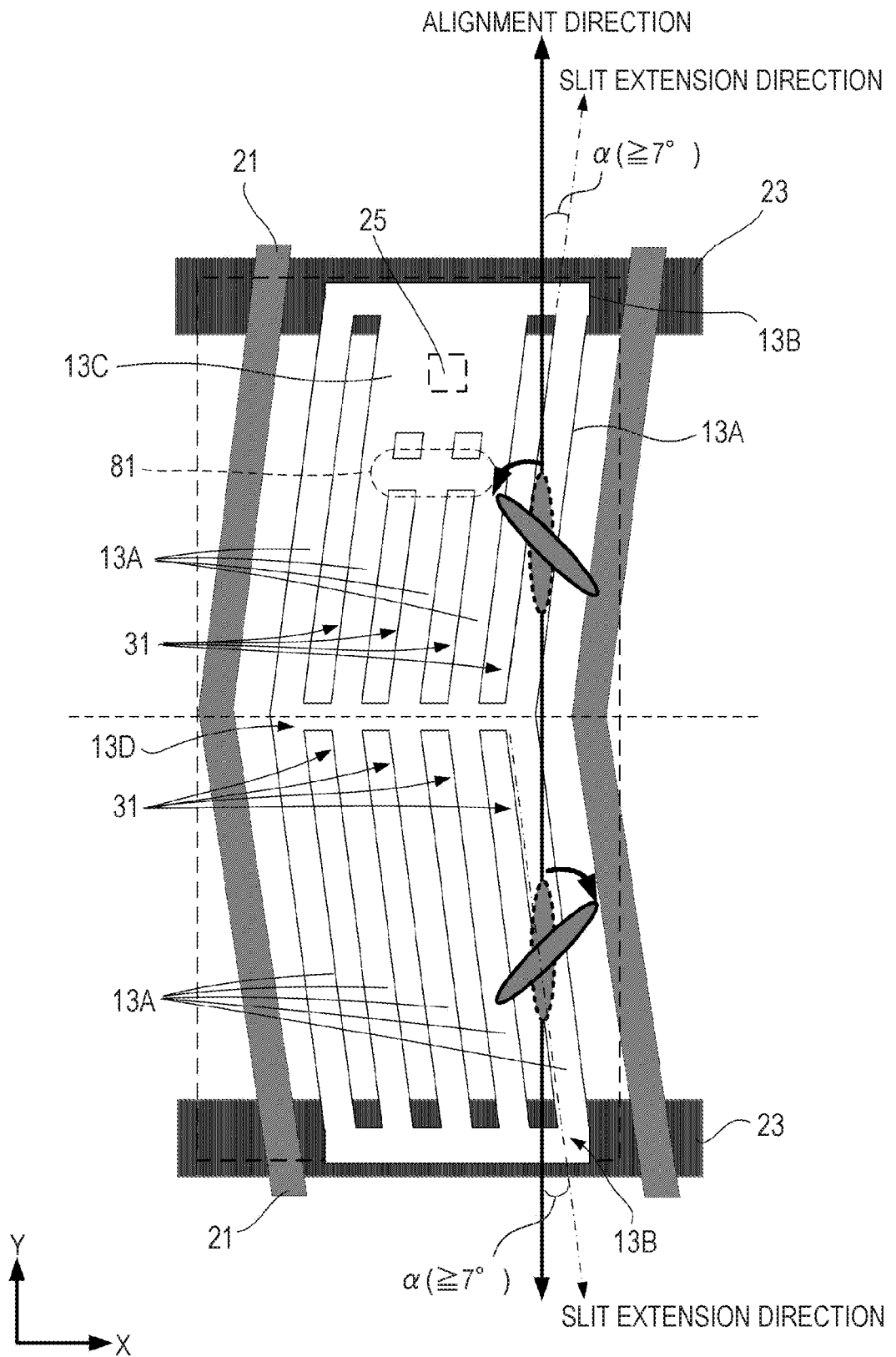
FIG. 15 is a diagram showing a fourth pixel structure example (planar structure).

FIG. 15 shows a fourth pixel structure example. This pixel structure corresponds to a modification of the dual domain structure shown in FIG. 14. That is, the pixel structure shown in FIG. 15 corresponds to a pixel structure in which each pixel has a dual domain structure, and has the same basic pixel structure as the pixel structure shown in FIG. 14.

A difference is that a connection branch 13D is additionally provided so as to transversely connect the bend points of the electrode branches 13A to each other.

The reason is as follows. In the third pixel structure of FIG. 14, the rotation direction of the liquid crystal molecules is inverted at the boundary between the domains (a portion around the bend point). For this reason, the alignment regulation force is weakened at the boundary, which causes alignment disturbance. The alignment disturbance may adversely affect the disappearance of the reverse twist line phenomenon.

Meanwhile, in the pixel structure example of FIG. 15, two domains can be physically separated from each other by the connection branch 13C which connects all the five electrode branches 13A at the bend points.

For this reason, it is possible to eliminate disturbance of the arrangement of the liquid crystal molecules at the boundary between the domains. As a result, with the pixel structure shown in FIG. 15, the time until the reverse twist line disappears can be further shortened, as compared with the pixel structure shown in FIG. 14.

(F) Pixel Structure Example 5

In the above-described four pixel structure examples, the FFS type liquid crystal panel having the sectional structure described with reference to FIG. 1 has been described. That is, a liquid crystal panel has been described which has a pixel structure in which the counter electrode 15 is disposed below the comb-shaped pixel electrode 13 so as to cover the entire pixel region.

Figure 16:
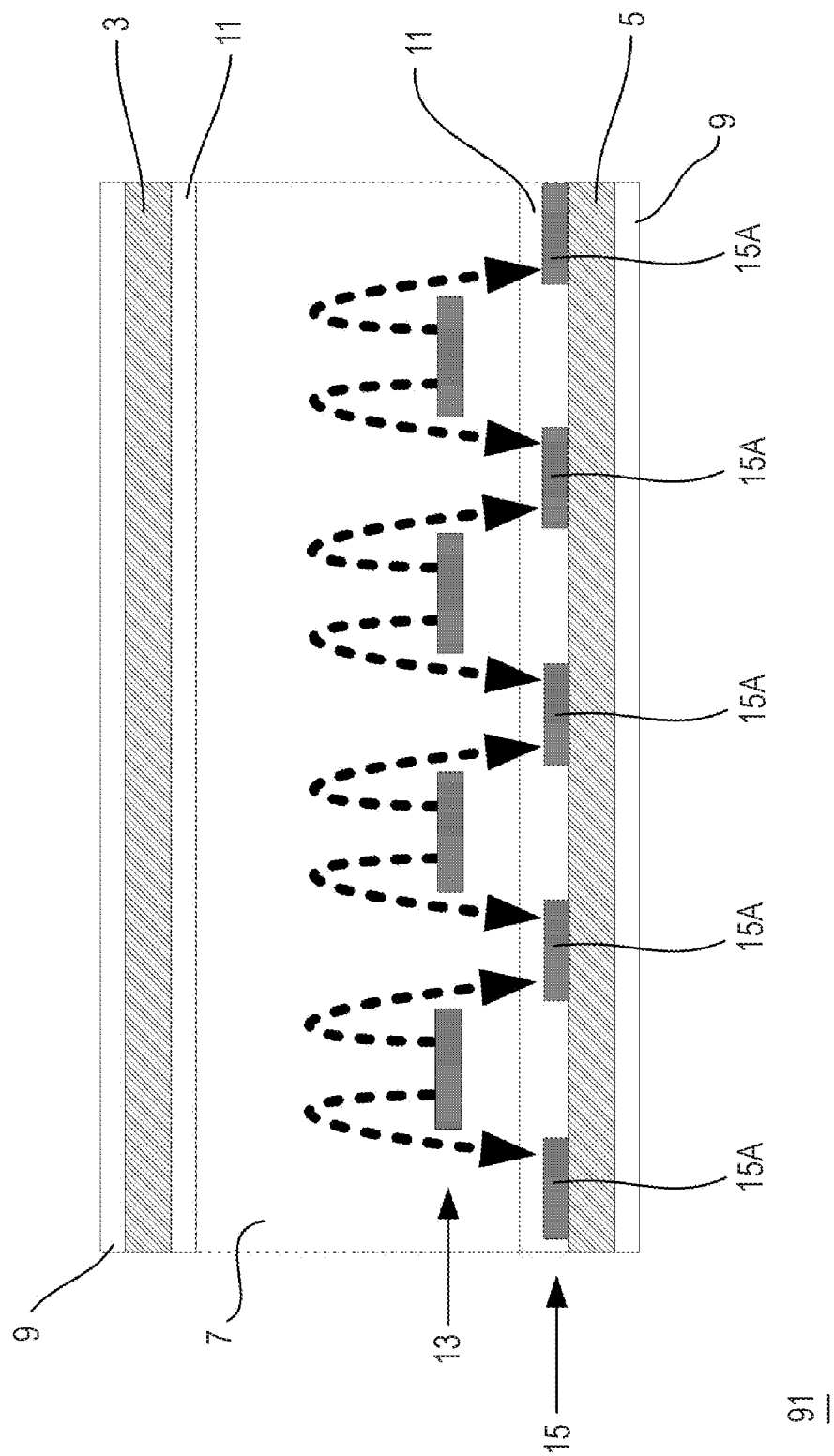
FIG. 16 is a diagram showing a fifth pixel structure example (sectional structure).

Alternatively, as shown in FIG. 16, a liquid crystal panel 91 having a comb-shaped counter electrode 15 may be adopted. In FIG. 16, the corresponding elements to those in FIG. 1 are represented by the same reference numerals.

In FIG. 16, the electrode branches 15A of the counter electrode 15 are disposed so as to fill the spaces (slits 31) between the electrode branches 13A of the pixel electrode 13.

That is, the electrode branches 15A of the counter electrode 15 are disposed so as not to overlap the electrode branches 13A of the pixel electrode 13 in the pixel region. Of course, there is no difference in the electric field formed between the pixel electrode 13 and the counter electrode 15.

(G) Pixel Structure Example 6

In the above-described pixel structure examples, the description has been made of the pixel structure in which the pixel electrode 13 and the counter electrode 15 are formed in different layers.

Alternatively, the technique which has been suggested by the inventors may also be applied to a transverse electric field display type liquid crystal panel in which the pixel electrode 13 and the counter electrode 15 are formed in the same layer.

Figure 17:
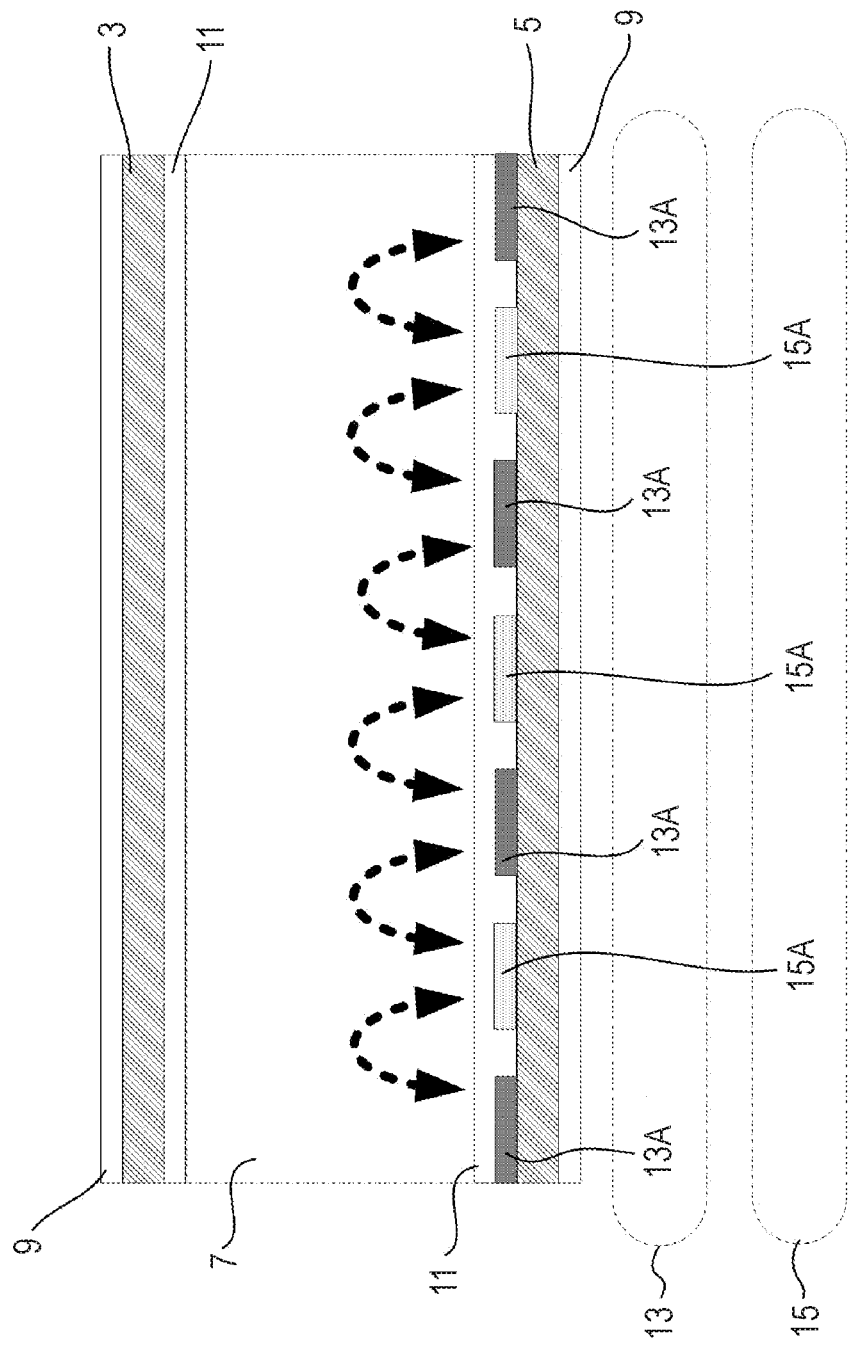
FIG. 17 is a diagram showing a sixth pixel structure example (sectional structure).
Figure 18:
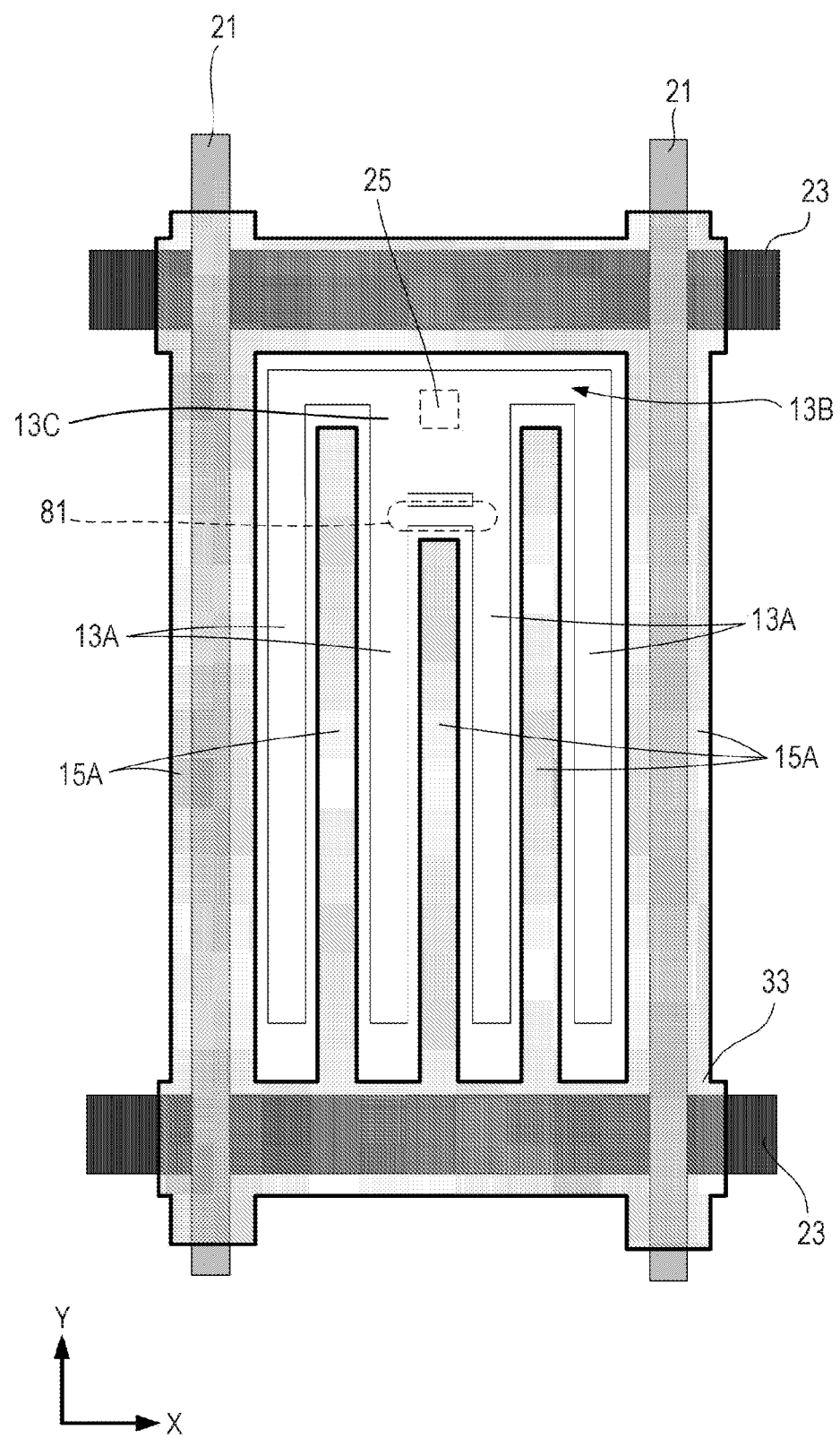
FIG. 18 is a diagram showing the sixth pixel structure example (planar structure).

FIG. 17 shows a sectional structure example corresponding to a sixth pixel structure example. FIG. 18 shows a planar structure example corresponding to the sixth pixel structure example. Note that the liquid crystal panel has the same basic structure as the liquid crystal panel with a different pixel structure.

That is, the liquid crystal panel 101 includes two glass substrates 3 and 5, and a liquid crystal layer 7 filled so as to be sandwiched with the glass substrates 3 and 5. A polarizing plate 9 is disposed on the outer surface of each substrate, and an alignment film 11 is disposed on the inner surface of each substrate.

In the liquid crystal panel 101 of FIG. 17, the pixel electrode 13 and the counter electrode 15 are formed on the glass substrate 5.

Of these, the pixel electrode 13 is structured such that one ends of comb-shaped four electrode branches 13A are connected to each other by a connection portion 13B.

Meanwhile, the counter electrode 15 in the pixel region is comb-shaped, similarly to FIG. 16. In FIG. 17, three electrode branches 15A are formed in the pixel region, and one end of each electrode branch 15A is connected to a common electrode line 33. In this case, the electrode branches 15A of the counter electrode 15 are formed in the same layer as the pixel electrode 13 so as to be fitted into the spaces between the electrode branches 13A of the pixel electrode 13. The common electrode line 33 is formed in a lattice shape so as to follow the signal lines 21 and the scanning lines 23, as shown in FIG. 18.

As described above, in this pixel structure example, the electrode branches 13A of the pixel electrode 13 and the electrode branches 15A of the counter electrode 15 are disposed in the same layer so as to alternately appear in the X-axis direction. With this electrode structure, a parabolic electric field is generated between the electrode branches 13A of the pixel electrode 13 and the electrode branches 15A of the counter electrode 15. In FIG. 17, this electric field is indicated by a broken line.

As shown in FIG. 18, in this pixel structure example, two electrode branches 13A directly extend from the contact portion 13C. Therefore, in this pixel structure, a partial connection branch 81 is formed so as to connect the two electrode branches 13A to each other.

With this pixel structure, a liquid crystal panel can be realized in which a reverse twist line is unlikely to occur around the center of the pixel region due to external pressure, such as finger press or the like.

(H) Pixel Structure Example 7

In the above-described six pixel structure examples, a case where the extension direction of each slit 31 formed by the electrode branches 13A of the pixel electrode 13 is parallel to the Y-axis direction or crosses the Y-axis direction at an acute angle has been described.

Alternatively, the extension direction of each slit 31 formed by the electrode branches 13A of the pixel electrode 13 may be parallel to the X-axis direction or may cross the X-axis direction at an acute angle.

Figure 19:
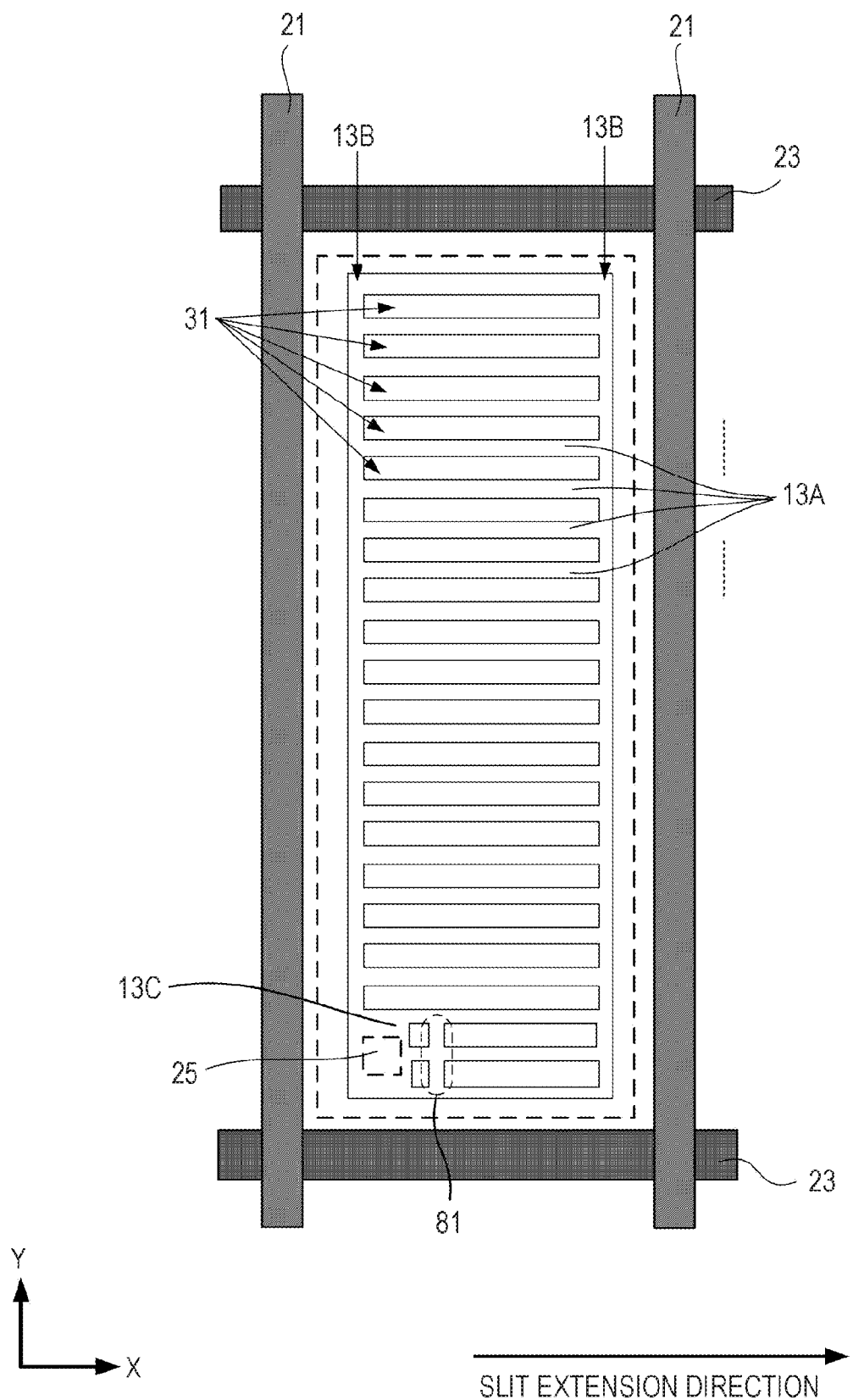
FIG. 19 is a diagram showing a seventh pixel structure example (planar structure).

FIG. 19 shows an example of such a pixel structure. FIG. 19 shows a pixel structure example when the pixel electrode 13 and the counter electrode 15 are disposed in different layers on the glass substrate 5 (FIG. 1). Of course, the same pixel structure as the sixth pixel structure example may also be considered.

Description will be made again with reference to FIG. 19. In FIG. 19, the electrode branches 13A of the pixel electrode 13 are formed in parallel to the scanning line 23. Both ends of the electrode branches 13A are connected by connection portions 13B. For this reason, a slit 31 formed between the electrode branches 13A extends in the X direction.

In this pixel structure example, the alignment regulation force is likely to be weakened at the boundary between the contact portion 13C and the electrode branch 13A directly extending from the contact portion 13C.

However, the partial connection branch 81 is formed so as to transverse the electrode branches 13A, so, as in the above-described pixel structure examples, a reverse twist line due to the application of external pressure in the relevant region can be effectively prevented from growing.

(I) Other Examples (I-1) Substrate Material

In the above description of the examples, the substrate is a glass substrate, but a plastic substrate or other substrates may be used.

(I-2) Alignment Direction 1 of Alignment Film

Of the above-described examples, in the case of the pixel structure example 1 (FIG. 8), it is assumed that the alignment direction of the liquid crystal layer 7 and the extension direction of the slit 31 cross each other at an acute angle of about 3°.

Of course, when the cross angle α is equal to or larger than 7°, similarly to the pixel structure example 2 (FIG. 10), the generated reverse twist line can be eliminated when the liquid crystal panel is left uncontrolled.

(I-3) Alignment Direction 1 of Alignment Film

Of the above-described examples, in the case of the pixel structure example 2 (FIG. 10), the pixel structure example 3 (FIG. 14), and the pixel structure example 4 (FIG. 15), an example where the cross angle α formed between the alignment direction of the liquid crystal layer 7 and the extension direction of the slit 31 is equal to or larger than 7° has been described.

Alternatively, the cross angle α may be smaller than 7°. In this case, display irregularity remains, but as described with reference to FIG. 9, a reverse twist line can be effectively prevented from growing at the central portion of the pixel region, so display quality can be improved.

(I-4) Product Examples

In the above description, various pixel structures capable of generating a transverse electric field have been described. Hereinafter, description will be provided for electronic apparatuses in which a liquid crystal panel having the pixel structure according to the examples (with no driving circuit mounted therein) or a liquid crystal panel module (with a driving circuit mounted therein) is mounted.

Figure 20:
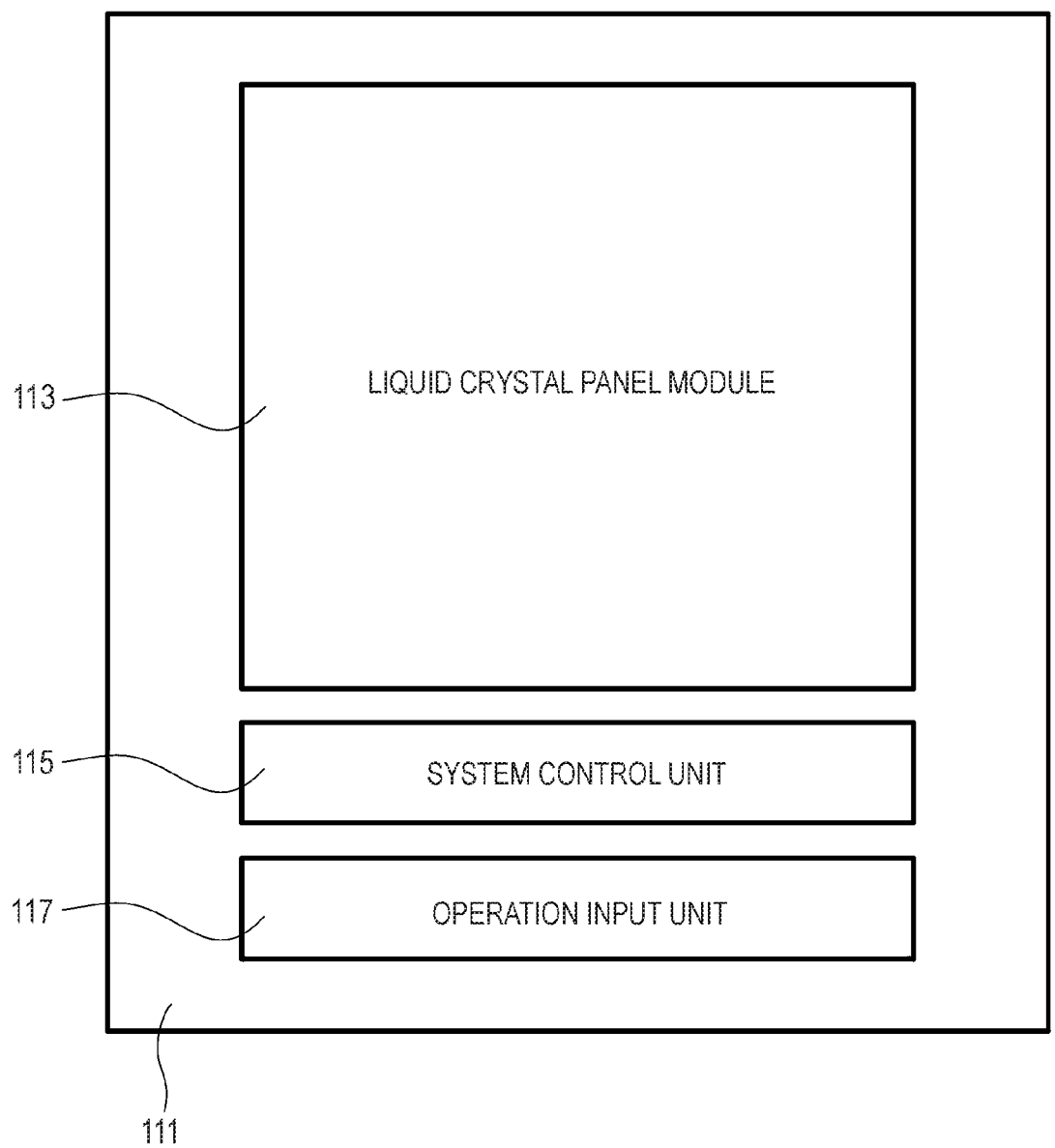
FIG. 20 is a diagram illustrating the system configuration of an electronic apparatus.

FIG. 20 shows a conceptual example of the configuration of an electronic apparatus 111. The electronic apparatus 111 includes a liquid crystal panel 113 having the above-described pixel structure, a system control unit 115, and an operation input unit 117. The nature of processing performed by the system control unit 115 varies depending on the product type of the electronic apparatus 111.

The configuration of the operation input unit 117 varies depending on the product type. A GUI (Graphic User Interface), switches, buttons, a pointing device, and other operators may be used as the operation input unit 117.

It should be noted that the electronic apparatus 111 is not limited to an apparatus designed for use in a specific field insofar as it can display an image or video generated inside or input from the outside.

Figure 21:
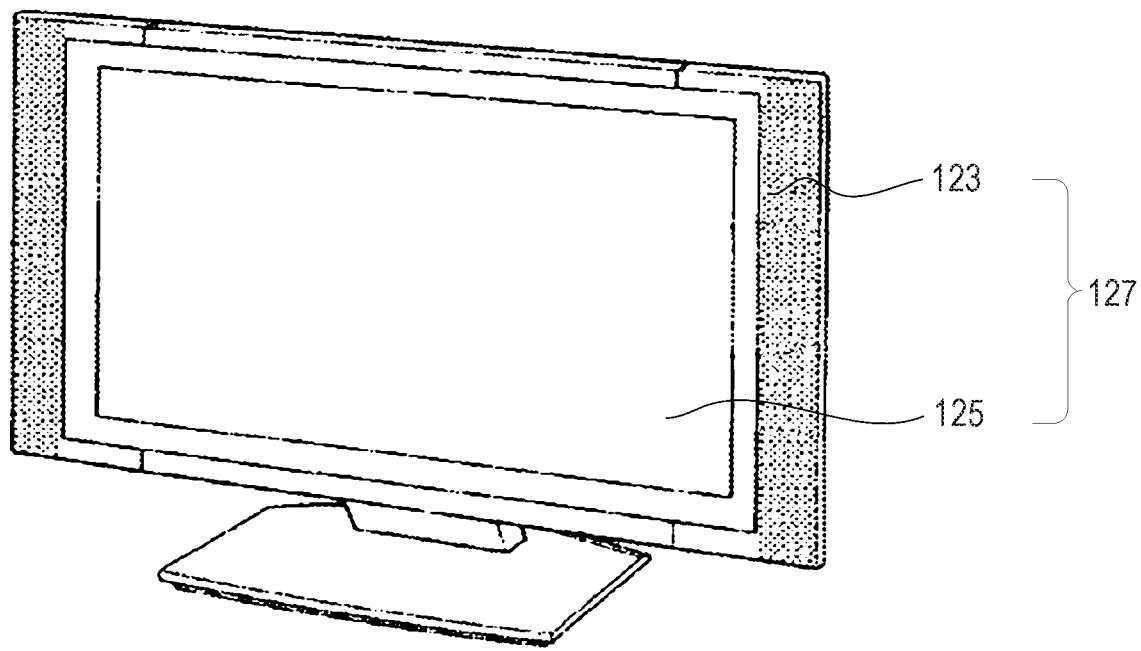
FIG. 21 is a diagram showing an appearance example of an electronic apparatus.

FIG. 21 shows an appearance example of a television receiver as an electronic apparatus. A television receiver 121 has a display screen 127 on the front surface of its housing. The display screen 127 includes a front panel 123, a filter glass 125, and the like. The display screen 127 corresponds to the liquid crystal panel according to the embodiment.

Figure 22A:
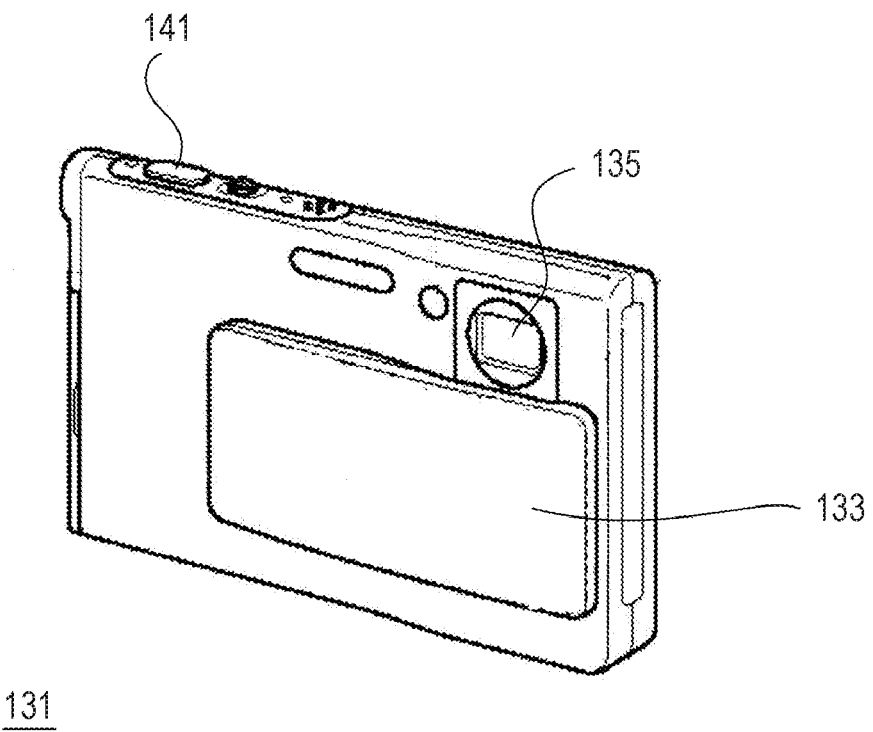
FIGS. 22A and 22B are diagrams showing an appearance example of an electronic apparatus.
Figure 22B:
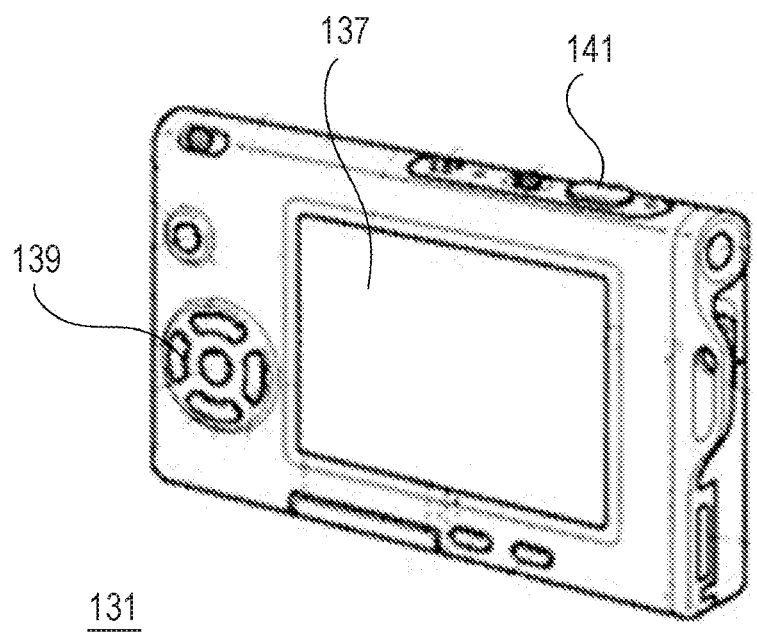

The electronic apparatus 111 may be, for example, a digital camera. FIGS. 22A and 22B show an appearance example of a digital camera 131. FIG. 22A shows an appearance example as viewed from the front (from the subject), and FIG. 22B shows an appearance example when viewed from the rear (from the photographer).

The digital camera 131 includes a protective cover 133, an imaging lens section 135, a display screen 137, a control switch 139, and a shutter button 141. Of these, the display screen 137 corresponds to the liquid crystal panel according to the embodiment.

Figure 23:
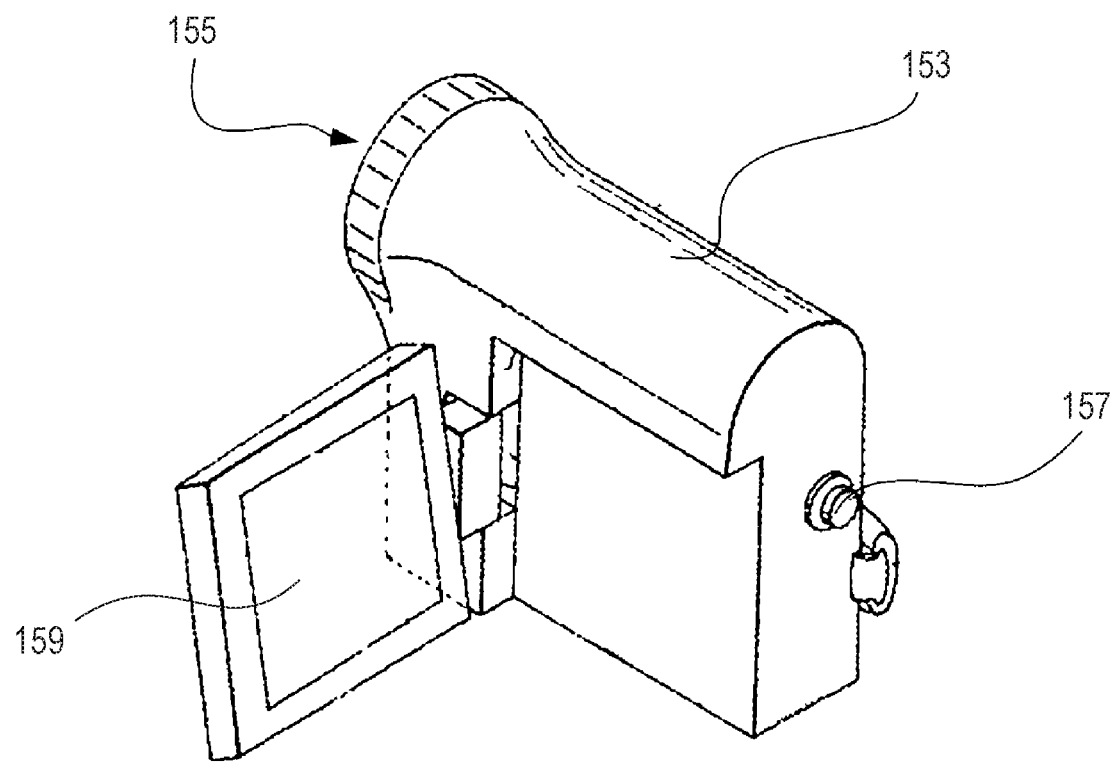
FIG. 23 is a diagram showing an appearance example of an electronic apparatus.

The electronic apparatus 111 may be, for example, a video camcorder. FIG. 23 shows an appearance example of a video camcorder 151.

The video camcorder 151 includes an imaging lens 155 provided to the front of a main body 153 so as to capture the image of the subject, a photographing start/stop switch 157, and a display screen 159. Of these, the display screen 159 corresponds to the liquid crystal panel according to the embodiment.

The electronic apparatus 111 may be, for example, a personal digital assistant. FIGS. 24A and 24B show an appearance example of a mobile phone 161 as a personal digital assistant. The mobile phone 161 shown in FIGS. 24A and 24B is a folder type mobile phone. FIG. 24A shows an appearance example of the mobile phone in an unfolded state, and FIG. 24B shows an appearance example of the mobile phone in a folded state.

The mobile phone 161 includes an upper housing 163, a lower housing 165, a connection portion (in this example, a hinge) 167, a display screen 169, an auxiliary display screen 171, a picture light 173, and an imaging lens 175. Of these, the display screen 169 and the auxiliary display screen 171 correspond to the liquid crystal panel according to the embodiment.

Figure 25:
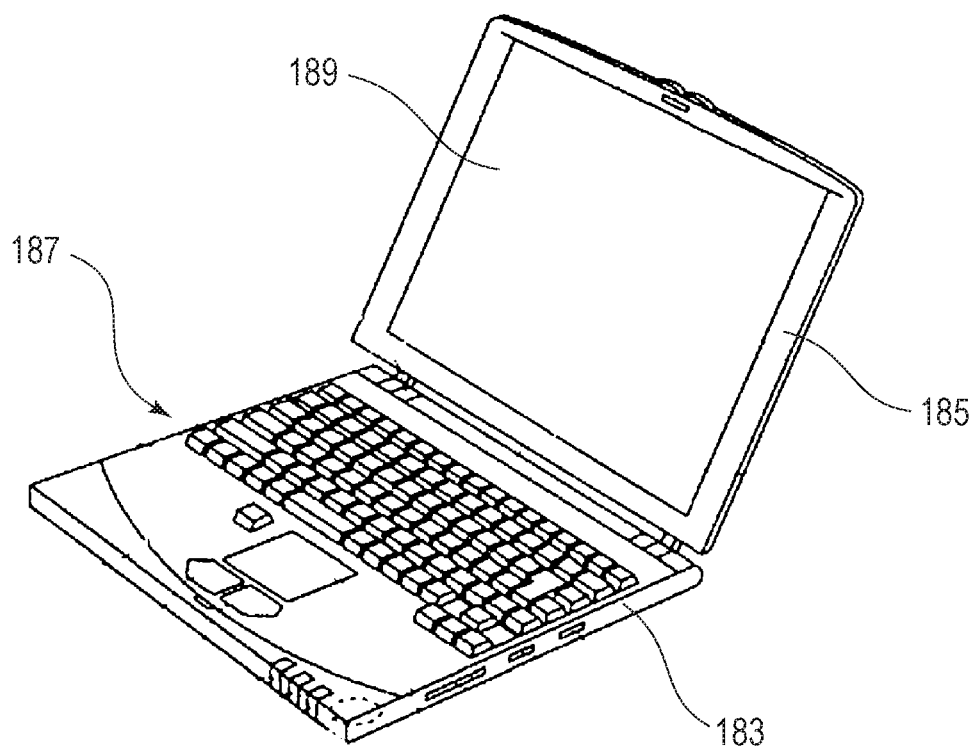
FIG. 25 is a diagram showing an appearance example of an electronic apparatus.

The electronic apparatus 111 may be, for example, a computer. FIG. 25 shows an appearance example of a notebook computer 181.

The notebook computer 181 includes a lower housing 183, an upper housing 185, a keyboard 187, and a display screen 189. Of these, the display screen 189 corresponds to the liquid crystal panel according to the embodiment.

In addition to the above-described electronic apparatuses, the electronic apparatus 111 may be, for example, a projector, an audio player, a game machine, an electronic book, an electronic dictionary, or the like.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A liquid crystal panel comprising:
    first and second substrates arranged to be opposite each other at a predetermined gap;
    a liquid crystal layer filled between the first and second substrates;
    a counter electrode pattern formed on the first substrate;
    a pixel electrode pattern formed on the first substrate;
    scanning lines to which control pulses for providing write timing of a signal potential are applied; and
    signal lines to which the signal potential is applied,
    wherein the pixel electrode pattern includes
        a contact portion connected to a first main electrode of a transistor, whose gate electrode is connected to one of the scanning lines, and whose second main electrode is connected to one of the signal lines,
        a plurality of elongated electrode branches having lengths greater than widths and formed in a pixel region surrounded by the scanning lines and signal lines,
        a plurality of elongated slits having lengths greater than widths and formed between the electrode branches in a lengthwise extending direction of the electrode branches,
        a partial connection branch of the pixel electrode pattern that is positioned nearer to the contact portion than to a center of the pixel region and that subdivides at least one of the slits in the lengthwise extending direction of the electrode branches into a plurality of slit portions aligned in said lengthwise extending direction of the electrode branches,
        a first connection portion connecting ends of each of the electrode branches at the ends adjacent to the contact portion,
        a second connection portion connecting the other ends of each of the electrode branches,
    wherein the electrode branches include:
    first electrode branches that connect the first connection portion and the second connection portion; and
    second electrode branches that connect the partial connection portion branch and the second connection portion,
    the contact portion is arranged between the first electrode branches in a widthwise extending direction of the electrode branches, the slit portions of each of the slits include a first slit portion and a second slit portion that is shorter than the first slit portion and that is disposed between the contact portion and the partial connection branch, and
    the partial connection branch is disposed between each of the first slit portion and the second slit portion of each of the slits.

2. The liquid crystal panel according to claim 1, wherein the pixel electrode pattern and the counter electrode pattern are formed on different layer surfaces.

3. An electronic apparatus comprising:
    a liquid crystal panel, the liquid crystal panel including
        first and second substrates arranged to be opposite each other at a predetermined gap,
        a liquid crystal layer filled between the first and second substrates,
        a counter electrode pattern formed on the first substrate, and
        a pixel electrode pattern formed on the first substrate,
        scanning lines to which control pulses for providing write timing of a signal potential are applied, and
        signal lines to which the signal potential is applied;
    a driving circuit driving the liquid crystal panel;
    a system control unit controlling the operation of the entire system; and
    an operation input unit receiving an operation input to the system control unit,
    wherein the pixel electrode pattern includes
        a contact portion connected to a first main electrode of a transistor, whose gate electrode is connected to one of the scanning lines, and whose second main electrode is connected to one of the signal lines,
        a plurality of elongated electrode branches having lengths greater than widths and formed in a pixel region surrounded by the scanning lines and signal lines,
        a plurality of elongated slits having lengths greater than widths and formed between the electrode branches in a lengthwise extending direction of the electrode branches,
        a partial connection branch of the pixel electrode pattern that is positioned nearer to the contact portion than to a center of the pixel region and that subdivides at least one of the slits in the lengthwise extending direction of the electrode branches into a plurality of slit portions aligned in said lengthwise extending direction of the electrode branches,
        a first connection portion connecting ends of each of the electrode branches with a side of at the ends adjacent to the contact portion, and
        a second connection portion connecting the other ends of each of the electrode branches,
    wherein the electrode branches include:
    first electrode branches that connect the first connection portion and the second connection portion; and
    second electrode branches that connect the partial connection portion branch and the second connection portion,
    the contact portion is arranged between the first electrode branches in a widthwise extending direction of the electrode branches, the slit portions of each of the slits include a first slit portion and a second slit portion that is shorter than the first slit portion and that is disposed between the contact portion and the partial connection branch, and the partial connection branch is disposed between each of the first slit portion and the second slit portion of each of the slits.

4. The liquid crystal panel according to claim 1, wherein a line that passes through both a center of the partial connection branch and a center of the pixel region is substantially parallel to the extending direction of the elongated electrode branches.

5. The electronic apparatus according to claim 3, wherein a line that passes through both a center of the partial connection branch and a center of the pixel region is substantially parallel to the extending direction of the elongated electrode branches.

6. The liquid crystal panel according to claim 1,
wherein
the contact portion is arranged between the first connection portion and the partial connection branch in the lengthwise extending direction of the electrode branches.

7. The electronic apparatus according to claim 3,
wherein
the contact portion is arranged between the first connection portion and the partial connection branch in the lengthwise extending direction of the electrode branches.

* * * * *